United States Patent
Blaize

(10) Patent No.: US 9,657,714 B2
(45) Date of Patent: May 23, 2017

(54) VERTICAL AXIS WIND TURBINE ROTOR AND AIRFOIL

(71) Applicant: X-Wind Power Limited, Sandwich (GB)

(72) Inventor: Michael Blaize, Dover (GB)

(73) Assignee: X-WIND POWER LIMITED, Sandwich (GB)

( * ) Notice: Subject to any disclaimer, the term of this patent is extended or adjusted under 35 U.S.C. 154(b) by 305 days.

(21) Appl. No.: 14/612,657

(22) Filed: Feb. 3, 2015

(65) Prior Publication Data
US 2015/0226181 A1   Aug. 13, 2015

(30) Foreign Application Priority Data
Feb. 13, 2014   (GB) .................................. 1402529.0

(51) Int. Cl.
| | | |
|---|---|---|
| B63H 1/26 | (2006.01) | |
| F03D 3/06 | (2006.01) | |
| F03D 3/00 | (2006.01) | |
| F03D 7/06 | (2006.01) | |
| F04D 29/38 | (2006.01) | |
| F01D 5/14 | (2006.01) | |

(52) U.S. Cl.
CPC .............. *F03D 3/061* (2013.01); *F03D 3/005* (2013.01); *F03D 7/06* (2013.01); *F01D 5/141* (2013.01); *F04D 29/384* (2013.01); *F05B 2240/214* (2013.01); *F05B 2240/301* (2013.01); *F05B 2250/712* (2013.01); *Y02E 10/74* (2013.01); *Y10T 29/49336* (2015.01)

(58) Field of Classification Search
CPC ............................. F04D 29/384; F01D 5/141
USPC .......................................................... 416/243
See application file for complete search history.

(56) References Cited

U.S. PATENT DOCUMENTS

| | | | |
|---|---|---|---|
| 5,269,647 A | 12/1993 | Moser | |
| 5,405,246 A | 4/1995 | Goldberg | |
| 6,264,429 B1 * | 7/2001 | Koeller | F01D 5/141 416/223 A |
| 8,419,373 B1 * | 4/2013 | Fukami | F03D 1/0633 415/4.3 |
| 2005/0271508 A1 * | 12/2005 | Beyene | F01D 1/30 416/132 A |
| 2008/0131267 A1 * | 6/2008 | Renaud | F01D 5/141 415/160 |

(Continued)

OTHER PUBLICATIONS

Search Report dated Oct. 24, 2014 from corresponding application No. GB1402529.0.

*Primary Examiner* — R. K. Arundale
(74) *Attorney, Agent, or Firm* — Brinks Gilson & Lione; G. Peter Nichols

(57) ABSTRACT

A vertical axis wind turbine with a symmetric airfoil having a concavely curved tail portion defining a trailing edge angle of between 0° and 5° on either side of the chord, a maximum thickness center point between 26% and 34% of the length of the chord from the leading edge, a leading edge curvature ratio (D1/D2) from 0.42 to 0.50, and a ratio of maximum thickness to chord length T/C from 0.12 to 0.19, preferably 0.16. Advantageously, the rotor may have helical blades defining a cylindrical swept envelope with a positive angle of attack and a solidity ratio NC/D from 0.125 to 0.270, and is governed at a tip speed ratio from 2.25 to 4.00.

15 Claims, 17 Drawing Sheets

(56) References Cited

U.S. PATENT DOCUMENTS

2008/0273978 A1 11/2008 Watkins
2015/0037164 A1* 2/2015 Fizer .................... F04D 29/384
416/223 R

* cited by examiner

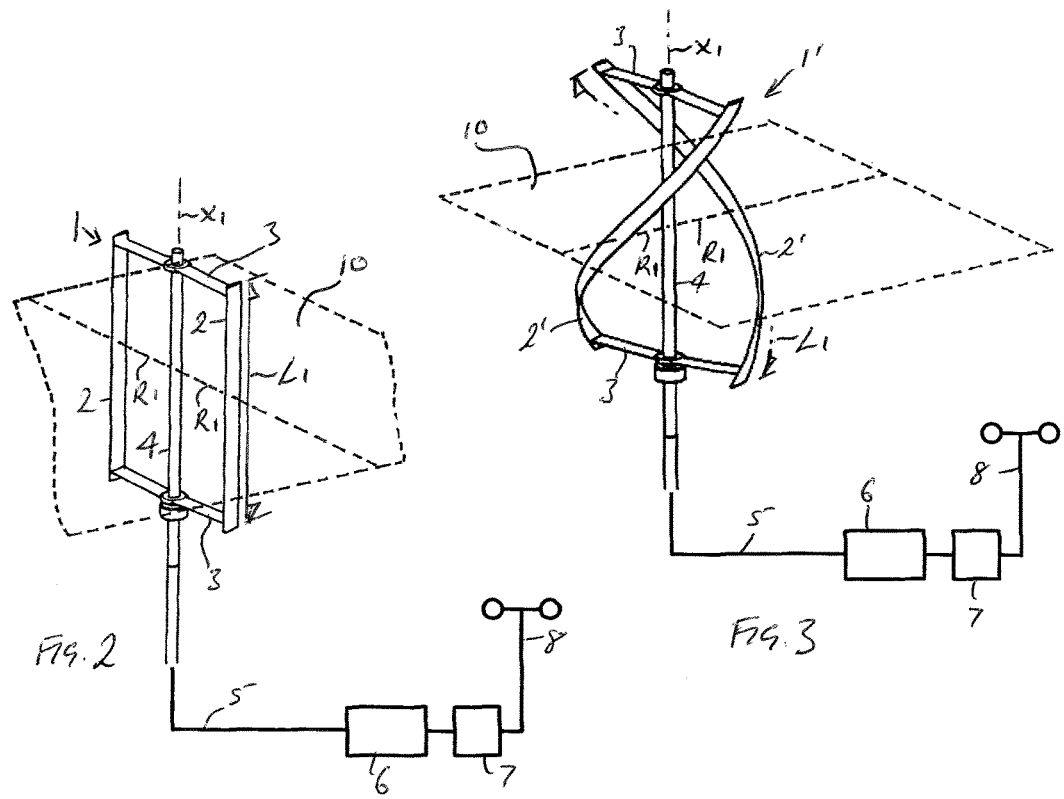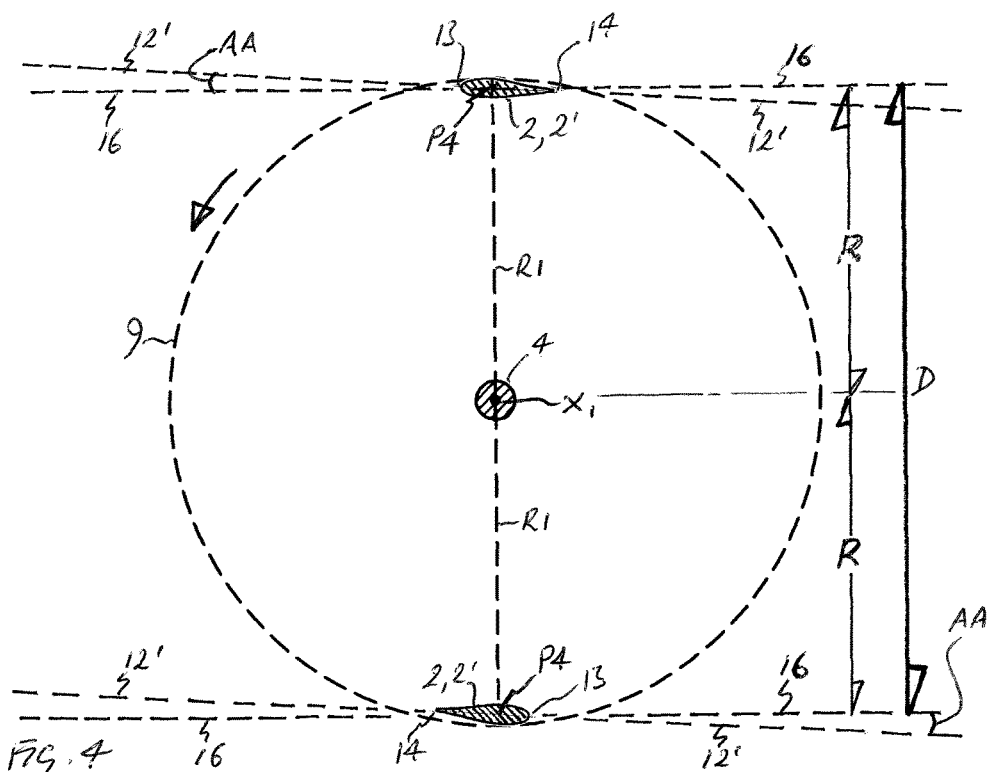

FIG. 12    PRIOR ART    NACA 0015
FIG. 13    PRIOR ART    NACA 0018
FIG. 14    PRIOR ART    S 824
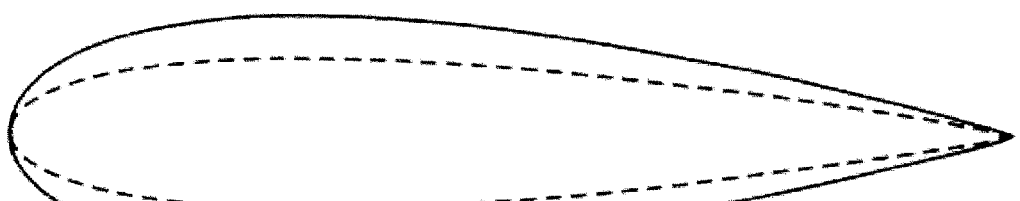
FIG. 15    PRIOR ART    
—— NACAopt
--- NACA 0015
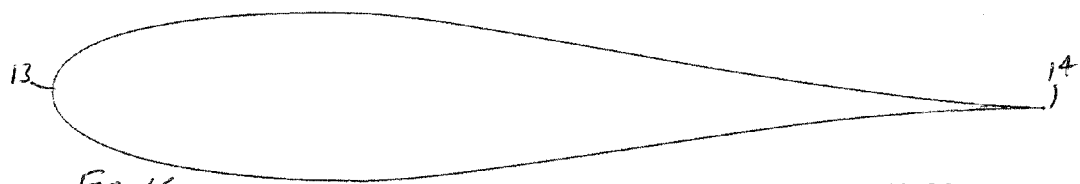
FIG. 16    XWA-003

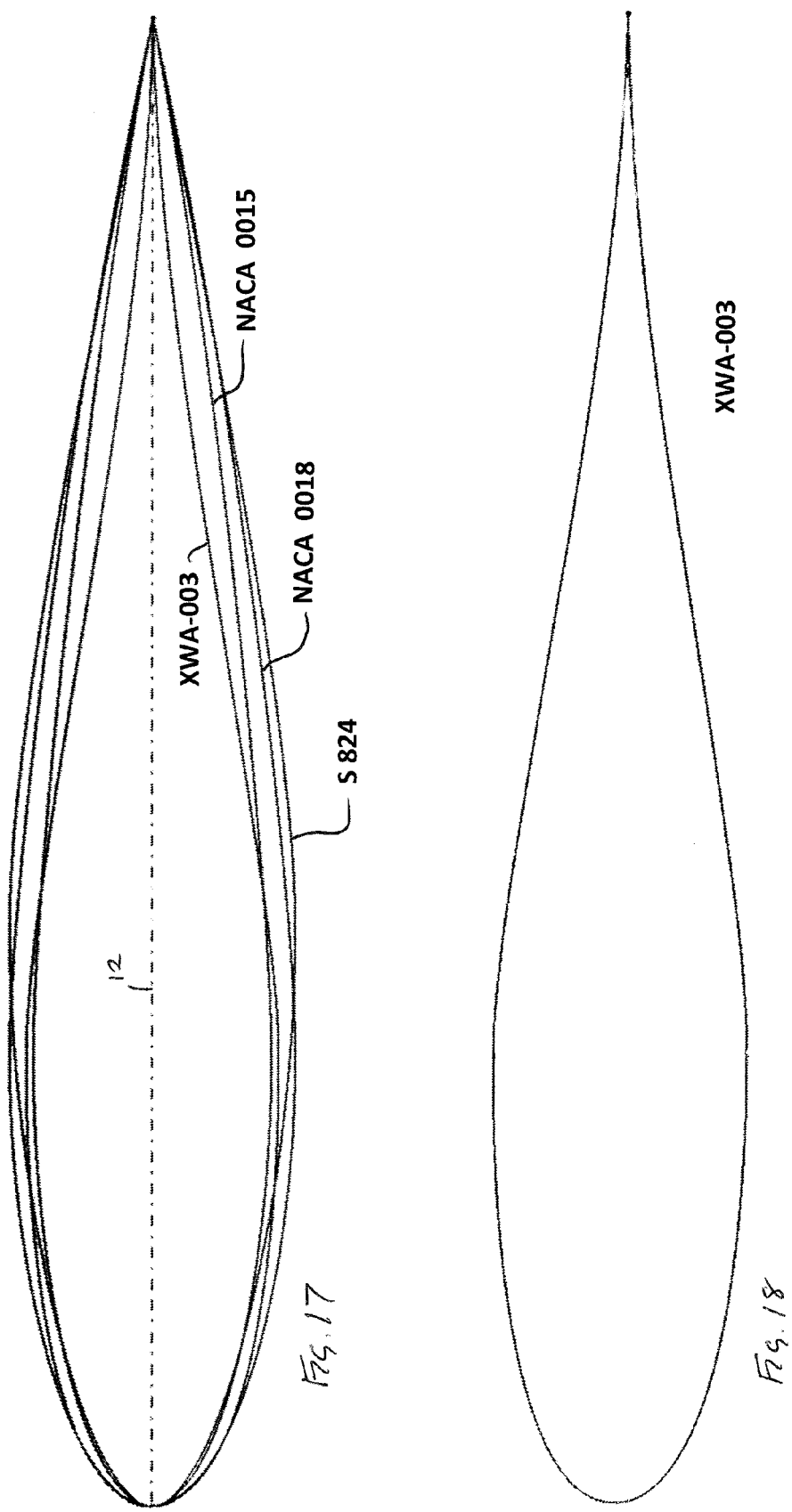

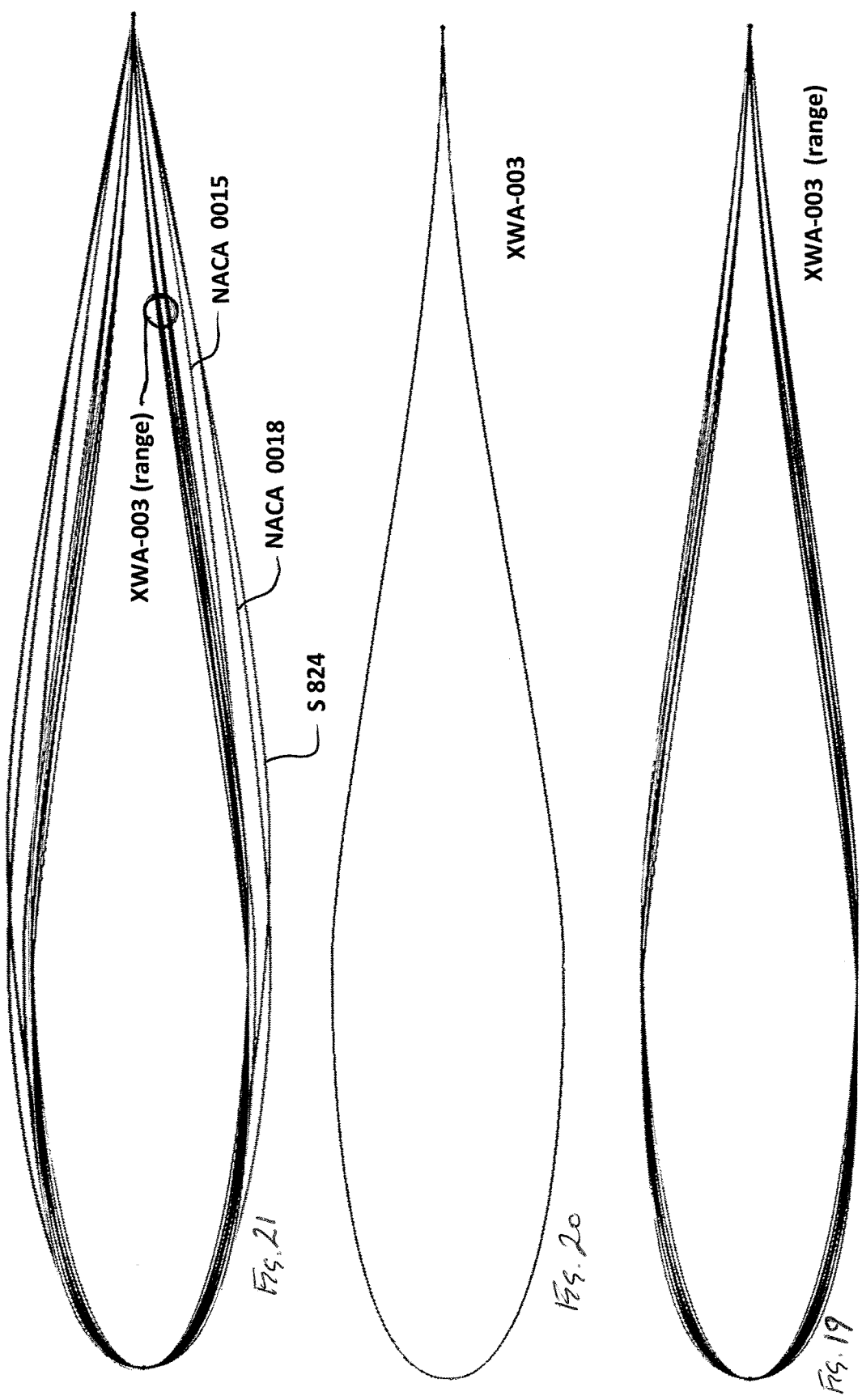

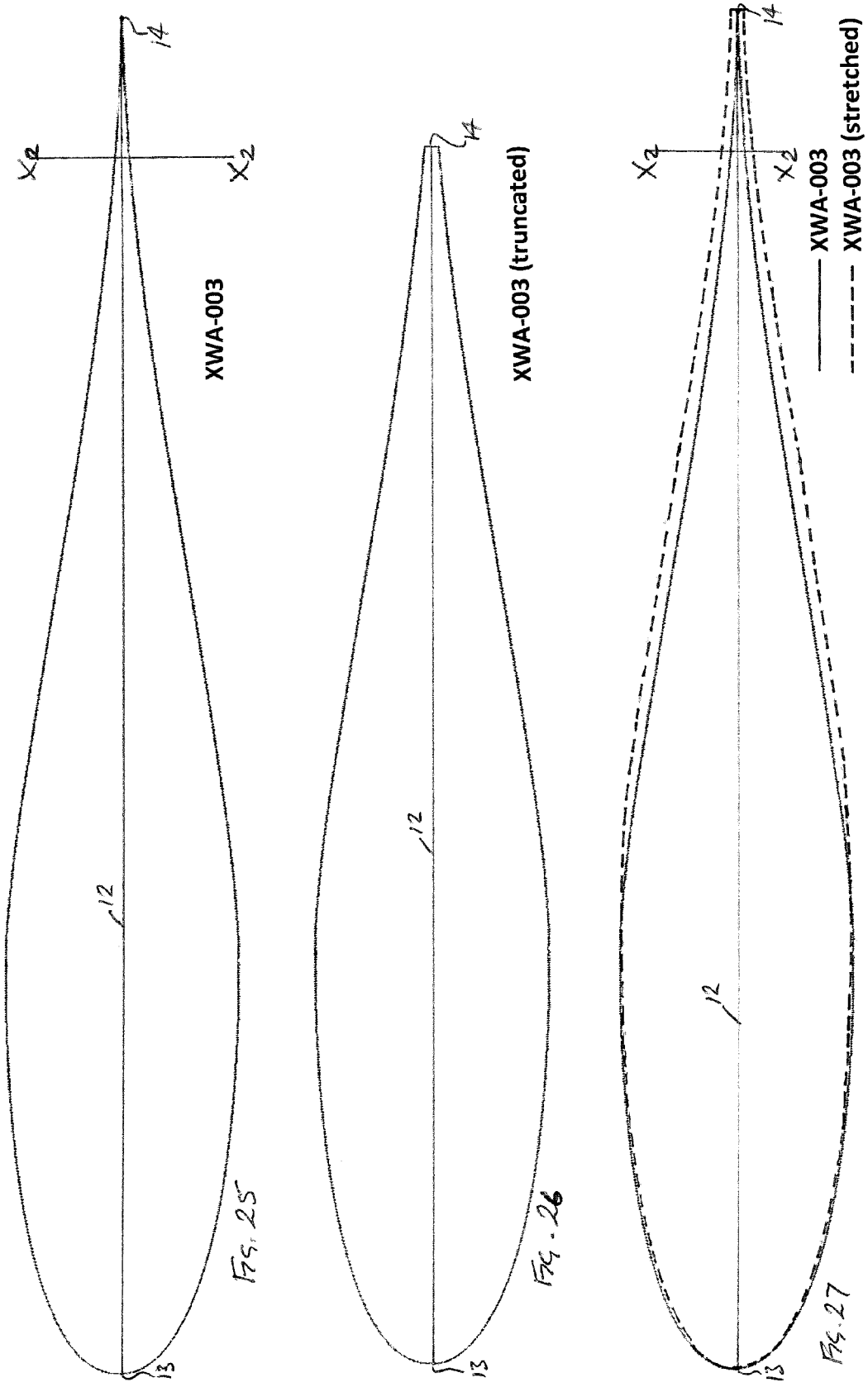

VERTICAL AXIS WIND TURBINE ROTOR AND AIRFOIL

This application claims priority to GB Application No. 1402529.0 filed Feb. 13, 2014; the entire contents of which is incorporated herein by reference.

This invention relates to rotors for vertical axis wind turbines (VAWTs), and in particular to aerofoil profiles for use in VAWT rotors.

In this specification, some key terms and their respective meanings are as follows:

Betz limit: the theoretical maximum coefficient of power achievable by an ideal wind turbine rotor (conceptualised as an "actuator disc"), taken to be 16/27=0.5926.

CFD: computational fluid dynamics.

Coefficient of power (Cp): a measure of the aerodynamic efficiency of a rotor, defined as the energy extracted by the rotor from a windstream as a proportion of the total kinetic energy contained in that windstream. The windstream is defined as that body of air passing through the rotor, i.e. having a cross section impinging on the swept envelope of the rotor.

Darrieus rotor: a rotor having an overall "eggbeater" or troposkien blade configuration.

DELTA: change in value.

Equatorial TSR: the tip speed ratio at the maximum diameter of a non-cylindrical (e.g. troposkien) rotor.

Footprint: a two-dimensional area defined by the projection of the swept envelope upon a horizontal ground surface.

Giromill: a VAWT rotor having generally straight blades which may be parallel with the rotation axis.

Gorlov type rotor: a rotor in which the blades extend, typically helically, around the axis of rotation.

HAWT: horizontal axis wind turbine. Generally in this specification a HAWT means a lift-type HAWT.

Lift-type rotor: a rotor with aerofoil blades.

Schmitz power coefficient: the theoretical maximum coefficient of power achievable by an ideal wind turbine rotor, based on the same principles as the Betz limit but modified to take account of the change in direction of the airflow downstream of the rotor.

Solidity ratio: a measure of the proportion of the swept envelope of a VAWT rotor occupied by the blades, which may be expressed as NC/R or NC/D (Number of blades× Chord length of each blade/Radius or Diameter of rotor).

Swept envelope: the surface of rotation defined by the motion of the radially outermost surfaces of the blades about the rotor axis.

Tip speed ratio (TSR): the rotational speed of the rotor at the radially outermost point of the blade as a proportion of the windspeed.

Troposkien: a curve formed by spinning a rope about a fixed axis between its ends.

VAWT: vertical axis wind turbine. Generally in this specification a VAWT means a lift-type VAWT.

FIG. 1 combines several different versions of a common diagram to show the wide variation in performance figures given by different sources for various types of wind turbine rotor. Although the figures should be regarded with caution, they provide a broad context within which the present invention may be better understood.

It will be noted that the identification of the respective sets of curves for the American multiblade and the Savonius rotor is commonly reversed, and here follows the view expressed in Magdi Ragheb and Adam M. Ragheb (2011)—Wind Turbines Theory—The Betz Equation and Optimal Rotor Tip Speed Ratio, Fundamental and Advanced Topics in Wind Power, Dr. Rupp Carriveau (Ed.), ISBN: 978-953-307-508-2, InTech, DOI: 10.5772/21398, which is available online at:
http://www.intechopen.com/books/fundamental-and-advanced-topics-in-wind-power/wind-turbines-theory-the-betz-equation-and-optimal-rotor-tip-speed-ratio Wind turbines can be broadly divided into horizontal axis wind turbines (HAWTs) and vertical axis wind turbines (VAWTs). Each of these groups can be divided again into reaction type turbines and lift type turbines.

Reaction type turbines rely on the pressure of the wind against the blades to rotate the rotor at a rate which is limited as a function of the windspeed. They are typified by a relatively low tip speed ratio and high torque, especially in the American multiblade type which is commonly used for water pumping and similar applications.

Lift type turbines employ blades which (unlike reaction type turbines) have an aerofoil profile to generate lift as the blades rotate at a higher speed than the moving windstream. Lift type turbines are able to extract more energy from a windstream than reaction type turbines, and their higher tip speed ratio and higher Cp makes them more suitable for electricity generation.

Lift type turbines are referred to hereinafter simply as "HAWTs" and "VAWTs".

Since the rotational speed of a VAWT rotor is not limited by the windspeed, the rotor is usually governed by at least one passive or active control system to maintain the optimal TSR and prevent destructive overspeed, for example, by modulating the current supplied to the field coil of the generator according to the output of a windspeed sensor, and by operating a separate braking system if a significant overspeed condition develops. The control system is also commonly arranged to drive the rotor up to its operating speed, for example, by using the generator as a motor.

Since each blade of a VAWT passes through an upstream position and a downstream position with each full revolution of the rotor, the optimal TSR is typically a value which allows the turbulence or wake created by an upstream blade to pass through the swept envelope of the rotor without intercepting any of the blades in their downstream position. This ensures that each blade can operate with maximum efficiency in a clean windstream. For optimal efficiency, VAWTs (like HAWTs) are usually designed with not more than three blades.

Most commercial wind power installations now use three bladed HAWTs. In part, this is due to the relatively lower efficiency commonly reported for the Darrieus rotor, which typically has two or three blades in a troposkien profile and is the only prior art VAWT rotor type represented in FIG. 1.

In the Darrieus rotor, the blades are typically arranged in a troposkien configuration in which (like the radial blades of a HAWT) radially outward forces are reacted in tension along the length of the blade, and so this rotor configuration can be designed for a relatively high equatorial TSR as represented in FIG. 1.

Disadvantageously however, since any given aerofoil profile will deliver optimal efficiency at a particular TSR, and since the TSR in a troposkien rotor will vary with the rotor diameter along the length of the blades, a blade having a constant section along its length will not perform optimally in a troposkien configuration.

Whereas the blades of the HAWT (as long as the rotor is yawed to point into the wind) are always presented in the same attitude to the windstream, the attitude of the blades of a VAWT changes through 360 degrees with respect to the windstream with each full rotation of the rotor. This has several consequences for the Darrieus rotor.

Firstly, the torque generated by each blade varies cyclically as the rotor of the VAWT rotates.

In the two-bladed Darrieus design with a troposkien blade configuration, this results in a strongly fluctuating torque which the transmission and other mechanical parts must be designed to accommodate. The fluctuating torque also gives rise to significant mechanical stresses in the blades as they deform with each rotation, and can generate undesirable low frequency noise and destructive resonance. These effects are also present, although less severe, in a three-bladed Darrieus design.

Secondly, a two-bladed Darrieus rotor will pass through a stalled position once in each rotation, and when static in the stalled position with respect to the windstream the rotor typically will not self-start. A three-bladed Darrieus rotor may also be reluctant to self-start.

Thirdly, the cyclical variation in the attitude of the VAWT blade with respect to the wind direction greatly complexifies the task of modelling and optimising the aerodynamic characteristics of the aerofoil, as further discussed below.

Another reason for the present tendency to overlook the VAWT as a serious contender to the HAWT for commercial power generation is the plethora of widely varying designs which have been proposed, often for use in urban environments. Although high efficiencies are often claimed for unusual rotor configurations, many of those skilled in the art take the view that wind power generation is only economically practical in locations where the windstream is uninterrupted and reasonably constant, and regard "urban wind" turbines as principally decorative rather than functional.

As distinct from the plethora of "urban wind" turbines mentioned above, the Giromill and Gorlov type VAWT rotors represent two important practical alternatives to the Darrieus configuration.

The Giromill rotor has straight blades arranged in spaced relation to the rotation axis; the blades may be vertical so that they describe a cylindrical swept envelope.

It will be appreciated that a VAWT rotor having a generally cylindrical swept envelope will capture a windstream of relatively larger cross-section than will a Darrieus rotor of the same maximum diameter, and so, ceteris paribus, its generating capacity will be proportionately greater. This is important in particular applications where the rotor must extract as much energy as possible but is confined by a given footprint. For example, a VAWT rotor may be located in open country in a narrow corridor defined by land ownership, such as beside a railway track or the like. In this case, although the railway track may pass over an open hilltop so that the windstream is generally unobstructed by fixed obstacles and the potential generating capacity is high, the swept envelope of the rotor cannot extend beyond the margin of the corridor or into the envelope defined by trains moving periodically along the track, and hence its diameter is strictly limited.

It will be appreciated that for applications of this nature, a VAWT will be preferred as having a substantially smaller footprint than a HAWT of comparable generating capacity, which must be free to yaw about its supporting tower as the wind direction changes.

Further advantageously, a rotor having a cylindrical swept envelope will have a constant TSR along the length of the blades. Where the blade is of constant section along its length, which simplifies design and manufacture, this means that (unlike the Darrieus troposkien configuration) the whole blade can operate at optimal efficiency when the rotor is governed at its optimal TSR.

In the second important alternative to the Darrieus configuration, the "Gorlov" type rotor is characterised by blades which extend around the rotation axis, typically in a helical configuration.

The Gorlov design offers a further important advantage over the Darrieus rotor and over straight bladed VAWT rotors in that, by arranging the blades to extend, preferably helically, for 360 degrees around the rotation axis, and at the same time by arranging the blades at a constant radius from the axis so that the rotor describes a cylindrical swept envelope, a near-constant torque is obtained as the rotor rotates. At the same time, when the rotor is stationary, at least one portion of the blades is optimally located to generate lift irrespective of the direction of the wind, so that in principle, a Gorlov rotor is capable of self-starting.

In each rotor configuration, the efficiency of a VAWT is critically dependent on the profile of the aerofoil.

Although most commercial attention is now directed to the technical optimisation of the HAWT, a substantial programme of research on VAWT rotors and aerofoils was carried out from the mid-1970s to the mid-1990s at the Sandia National Laboratory (a multi-program laboratory managed and operated by Sandia Corporation, a wholly owned subsidiary of Lockheed Martin Corporation, for the U.S. Department of Energy's National Nuclear Security Administration under contract DE-AC04-94AL85000).

The Sandia research programme included the development of an experimental 34 m diameter Darrieus rotor called the "Test Bed", and was paralleled by the commercial installation by FloWind Corporation of a fleet of 19 m diameter Darrieus rotors. The programme came to an end following multiple fatigue failures in the extruded aluminium blades of the commercial rotors, which may be regarded as contributing to the subsequent shift of attention to the HAWT as the preferred technology.

The Sandia programme generated a body of research papers which are available online at:
http://energy.sandia.gov/?page_id=3057#VAWTARCHIVE These publications may be regarded as one of the principal sources of technical information on VAWT aerofoil design, particularly because (in contrast to much of the subsequent commercial and patent literature) the efficiency figures presented in these papers are based on a substantial body of independent test data. An overview is presented in Sandia report no. SAND2012-0304—Herbert J. Sutherland, Dale E. Berg, and Thomas D. Ashwill: A Retrospective of VAWT Technology (January 2012), which is available online at:
http://energy.sandia.gov/wp/wp-content/gallery/uploads/SAND2012-0304.pdf Reflecting the complex aerodynamics of the cyclic upwind/downwind movement of the blades, the design parameters of a VAWT aerofoil profile are so complexly interrelated that optimisation has proved an elusive goal, and even very sophisticated, iterative modelling using computational fluid dynamics software can lead to a wide range of possible outcomes.

This may be appreciated by comparing the novel aerofoil profile taught herein with that disclosed by Travis J. Carrigan, Brian H. Dennis, Zhen X. Han, and Bo P. Wang, "Aerodynamic Shape Optimization of a Vertical-Axis Wind Turbine Using Differential Evolution," ISRN Renewable Energy, vol. 2012, Article ID 528418, 16 pages, 2012. doi:10.5402/2012/528418, which is available online at: http://www.hindawi.com/isrn/renewable.energy/2012/528418/cta/

The Carrigan et al. paper presents as a case study an optimised VAWT aerofoil profile developed from the NACA 0015 aerofoil by an automated software system combining rapid geometry generation and automated hybrid mesh generation tools with the FLUENT® v6.3 viscous, unsteady computational fluid dynamics simulation software and a parallel stochastic differential evolution algorithm. After running for 10 days to iteratively model and refine the geometry of the NACA 0015 aerofoil using a set of four variable parameters, the software converged on an optimum solution whereby the maximum thickness T/C of the aerofoil was modified to a value of 0.237 and the solidity ratio NC/D was optimised at 0.883, yielding an efficiency Cp of 0.409, 6% better than the baseline NACA 0015 aerofoil.

FIG. 15 reproduces the optimised aerofoil profile based on the NACA 0015 ($2^{nd}$ test case) as shown in FIG. 20 of that paper (Copyright © 2012 Travis J. Carrigan et al—Creative Commons Attribution License).

In consequence, a wide variety of aerofoil profiles, both symmetric and cambered, have been used in VAWT rotors. Of these, perhaps the most common is the NACA 0015, which was extensively tested during the Sandia programme and is still widely used in VAWT rotor design. The NACA 0018 is a symmetric aerofoil similar to the NACA 0015 but slightly thicker. (In the NACA 4-digit aerofoil series, the first two digits indicate the camber or degree of mean curvature away from the chord, with 00 indicating a symmetric aerofoil, while the last two digits indicate the ratio of maximum thickness to chord length, or T/C.)

The Somers S 824 symmetric aerofoil was designed for the "Extended Height-to-Diameter" (EHD) 300 kW, 18 m diameter Darrieus rotor with pultruded composite blades, developed by FloWind Corporation in the mid-1990s as part of the Sandia programme and intended as a successor to the earlier aluminium bladed design.

Although the field of VAWT rotor design embraces a wide range of both symmetric and cambered aerofoils, the NACA 0015, NACA 0018, and Somers S 824 have been selected for the sake of comparison as being similar (inter alia as symmetric aerofoils) to the novel aerofoil taught herein, and as being well documented for use in VAWT rotors. These prior art aerofoils will be referred to in more detail hereinafter to better illustrate the novel features and advantages of the present invention.

In light of the above discussion it is a general object of the present invention to provide a VAWT rotor which offers better efficiency when used for commercial electricity generation, particularly when installed in locations characterised by continual fluctuations in windspeed.

In some embodiments, the invention also sets out to maximise the electrical generating capacity of the rotor when installed in a limited footprint.

In a further aspect, the invention sets out to provide a method for designing such a rotor.

Accordingly in its various aspects the present invention provides a wind turbine rotor and a method as defined in the claims.

The novel rotor is characterised by blades having a novel aerofoil profile as described in more detail below. For convenience, an optimal embodiment of the novel aerofoil profile will be referred to hereinafter as the XWA-003 profile, and an optimal embodiment of the novel rotor incorporating the XWA-003 profile will be referred to as the XWA-003 rotor.

Surprisingly, it is found that at a nominal windspeed of 8 m/s the aerodynamic efficiency (Cp) of the novel rotor is in excess of 0.45 and in its optimal (XWA-003) embodiment can reach a Cp of about 0.469, substantially higher than prior art VAWT rotors.

Further features and advantages will be understood from the following illustrative embodiments which will now be described, purely by way of example and without limitation to the scope of the claims, and with reference to the accompanying drawings, in which:

FIG. 1 combines several different versions of a common diagram comparing the efficiency of different types of wind turbine rotor;

FIG. 2 shows a wind turbine installation having a cylindrical rotor with two straight blades of the novel XWA-003 profile;

FIG. 4 is a section through the XWA-003 rotor of FIG. 2 or FIG. 3 in the plane 10;

Figure 8:
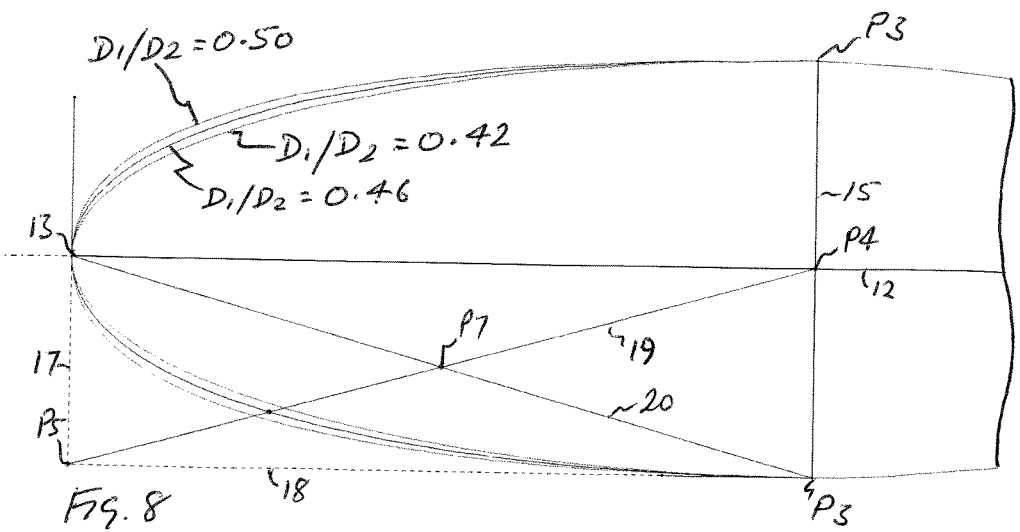
FIG. 8 shows the range of leading edge curvature according to the invention for the case where the centre point position and T/C ratio are optimal.
Figure 11:
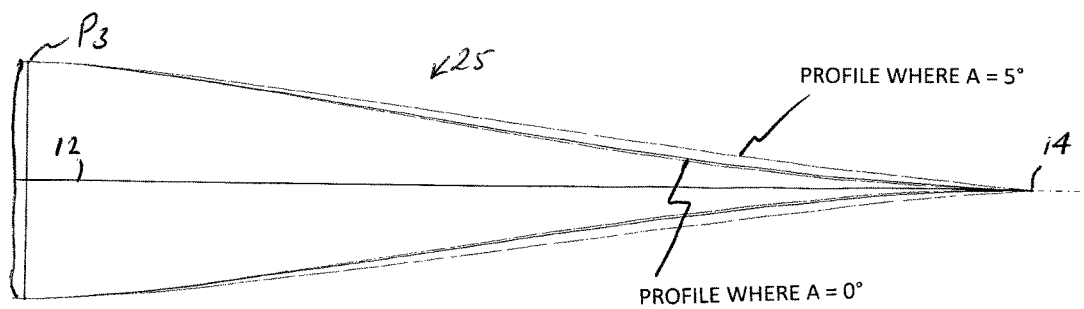
FIG. 11 illustrates the range of trailing edge angle A according to the invention for the case where the centre point position and T/C ratio are optimal.
Figure 22:
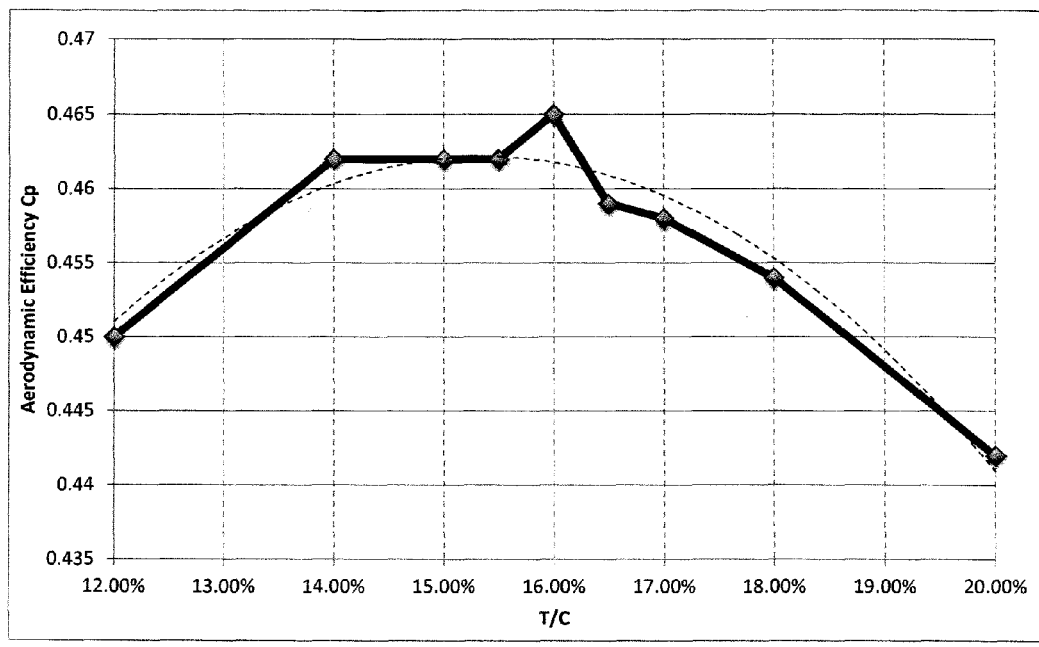
Figure 23:
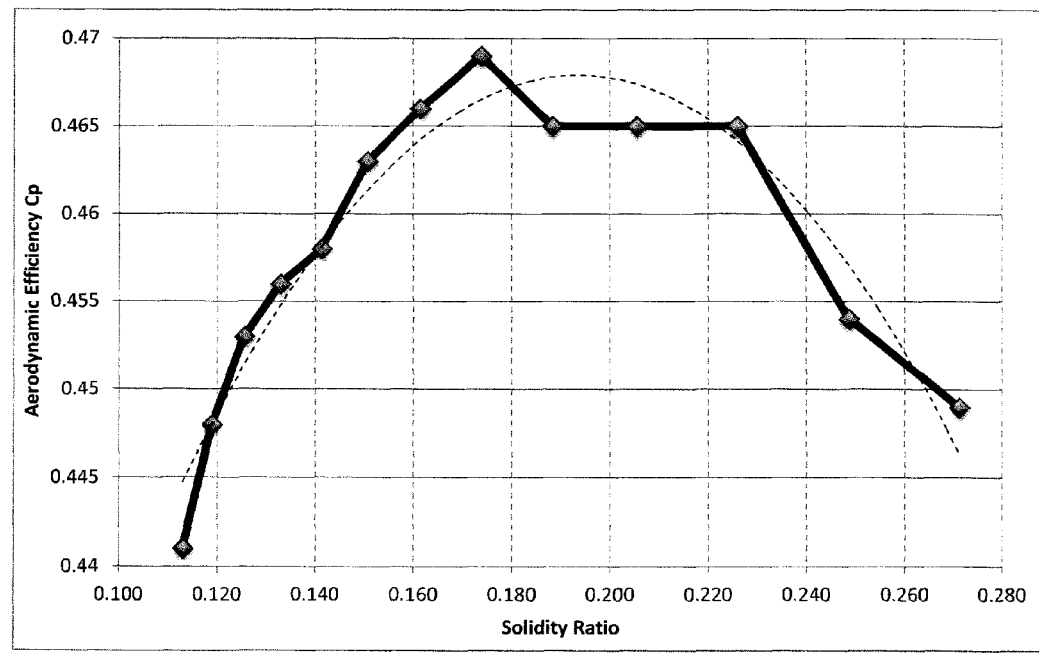
Figure 24:
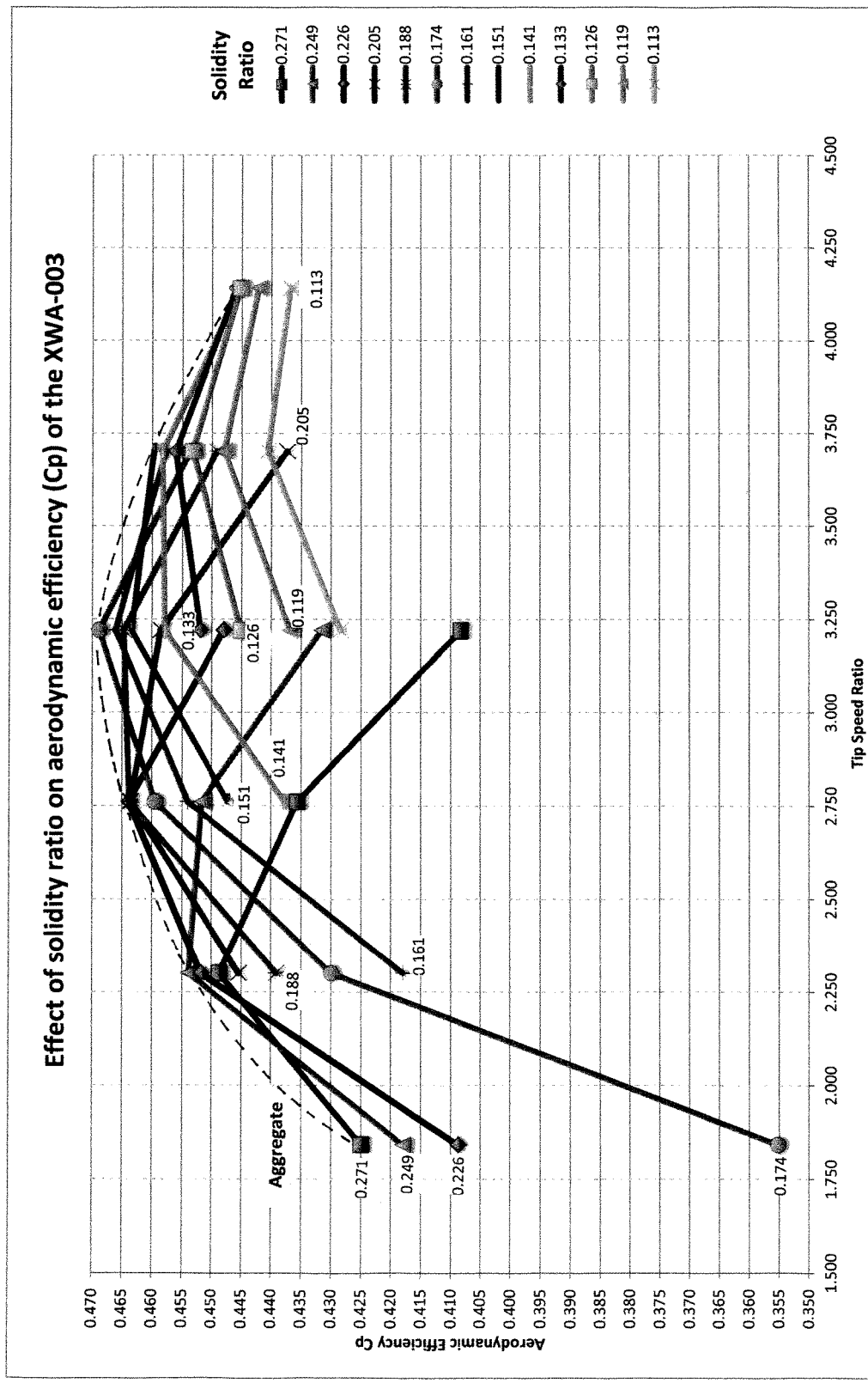
Figure 28:
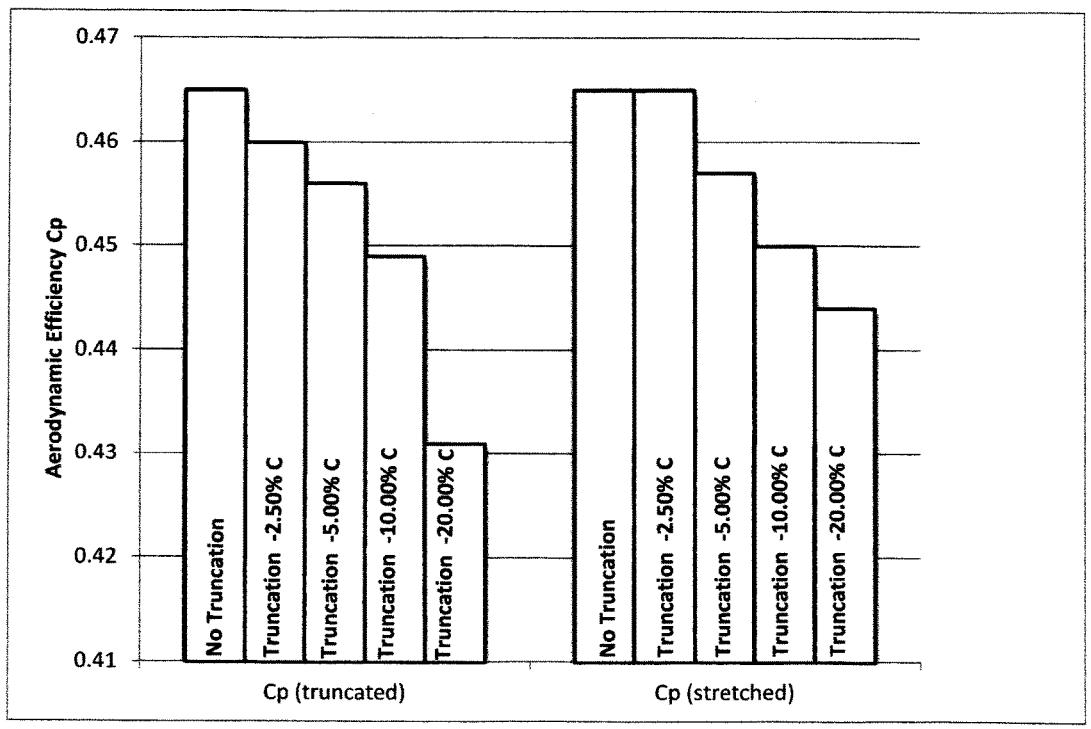
Figure 29:
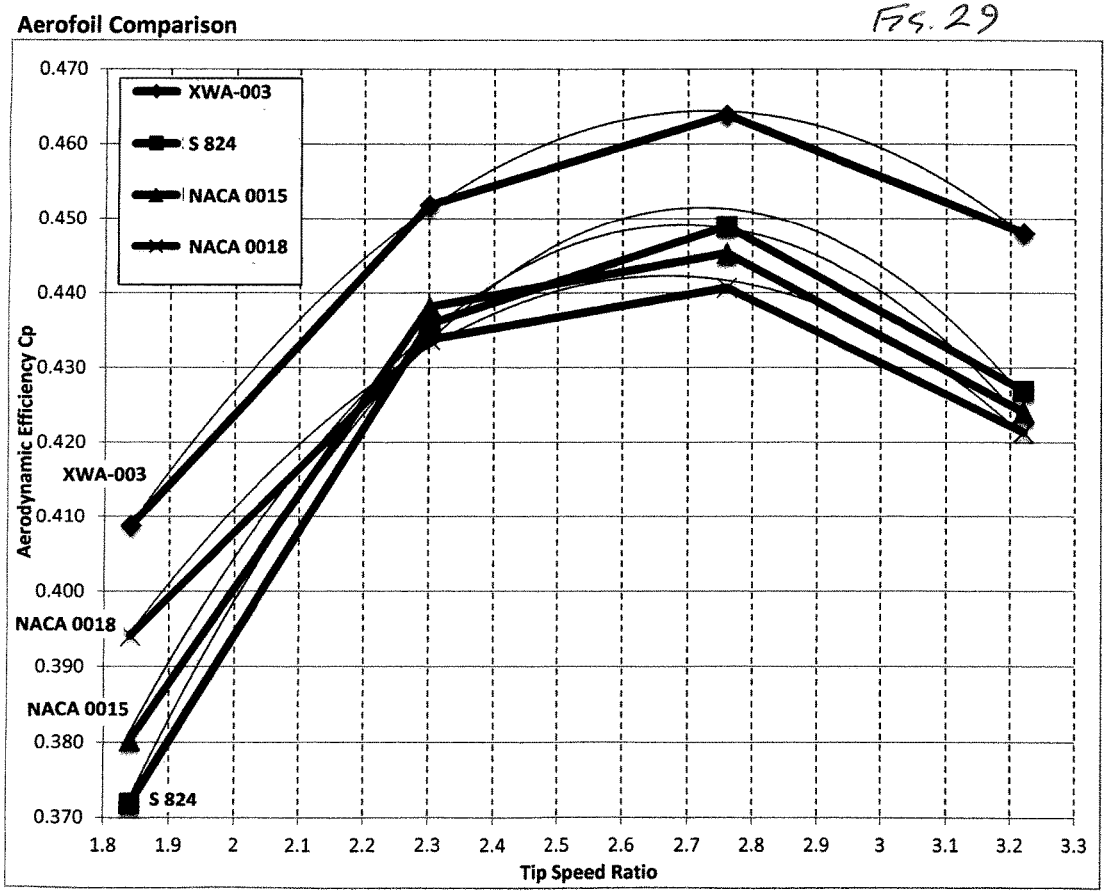
Figure 30:
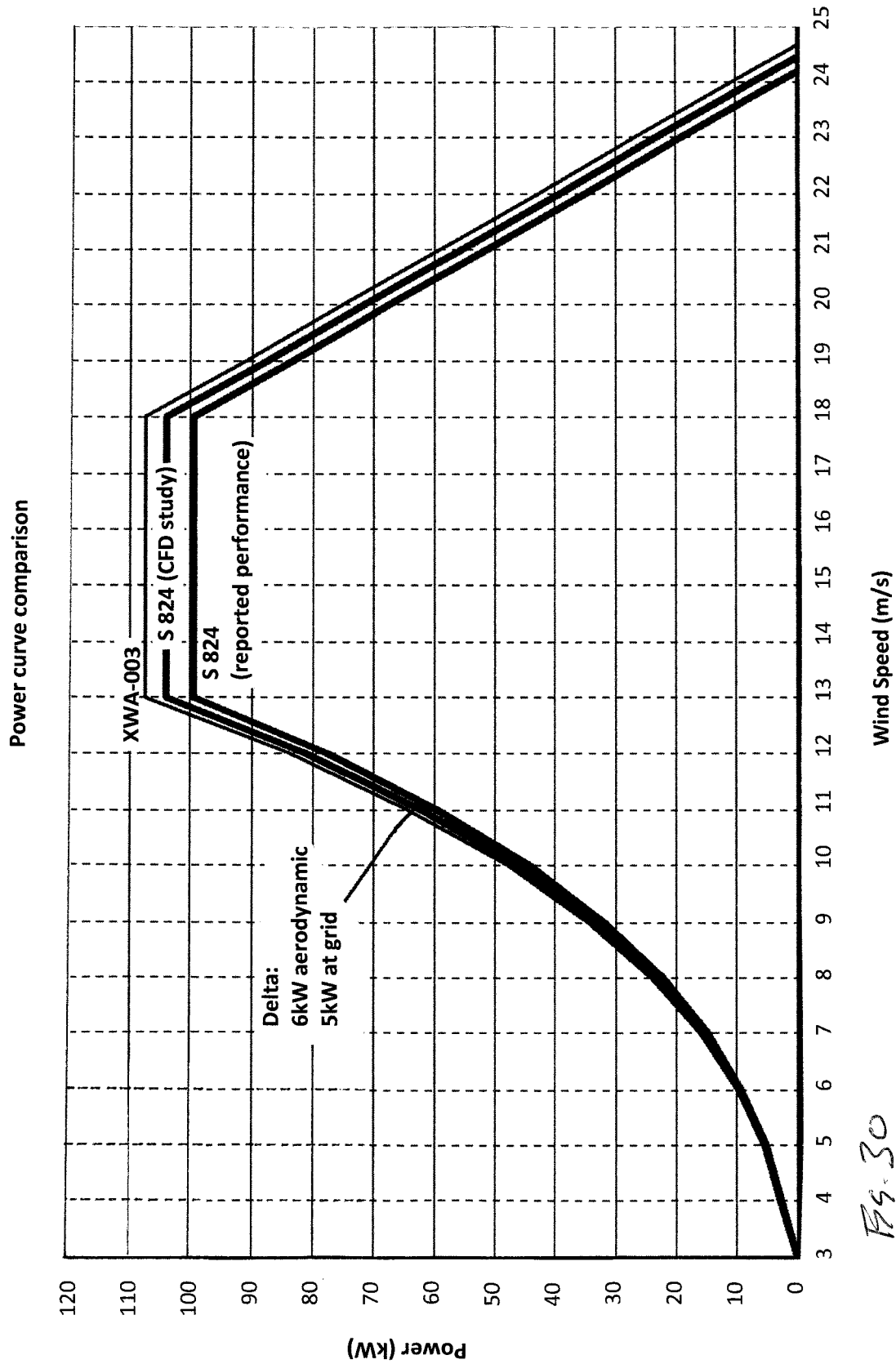
Figure 31:
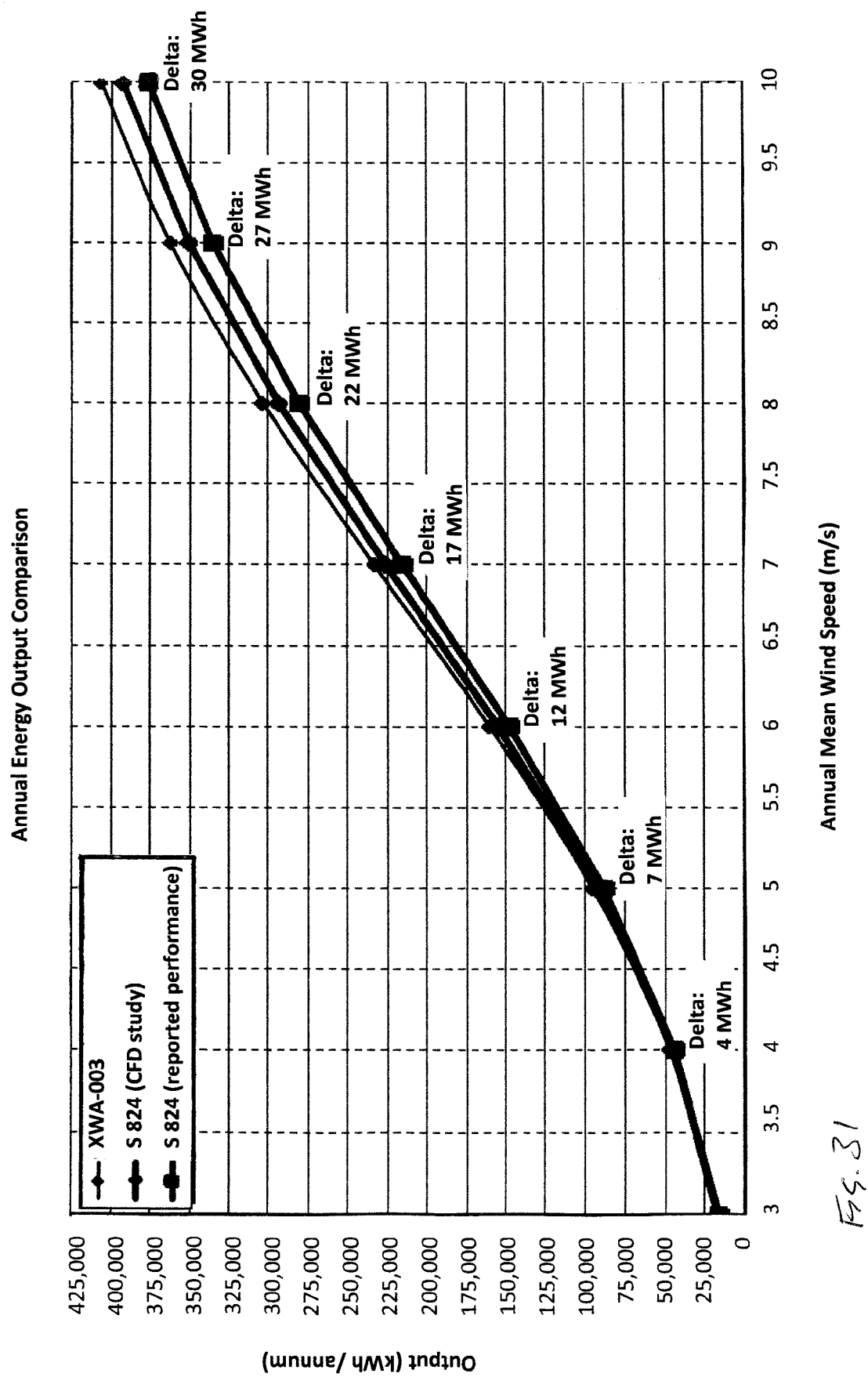
Figure 32:
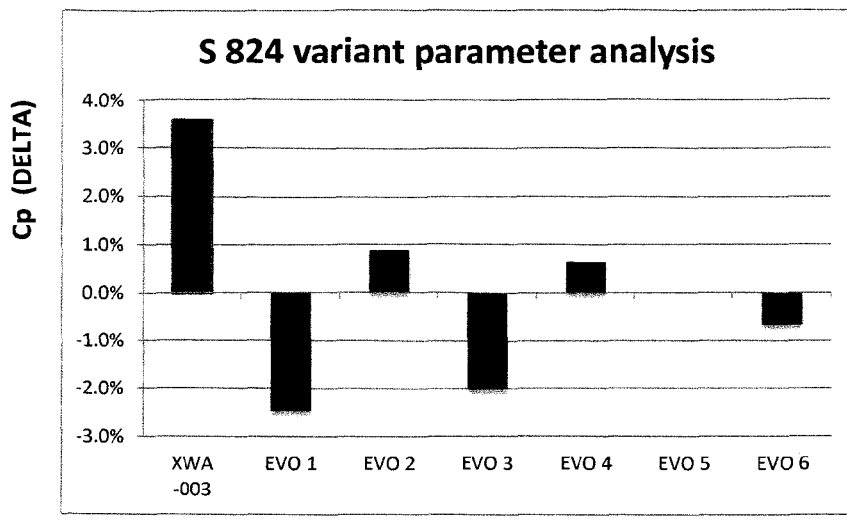
Figure 33:
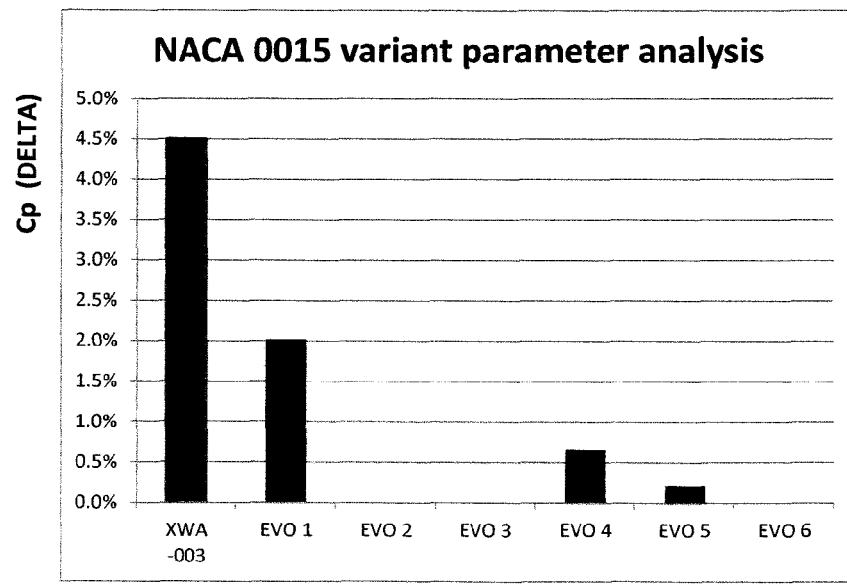
Figure 34:
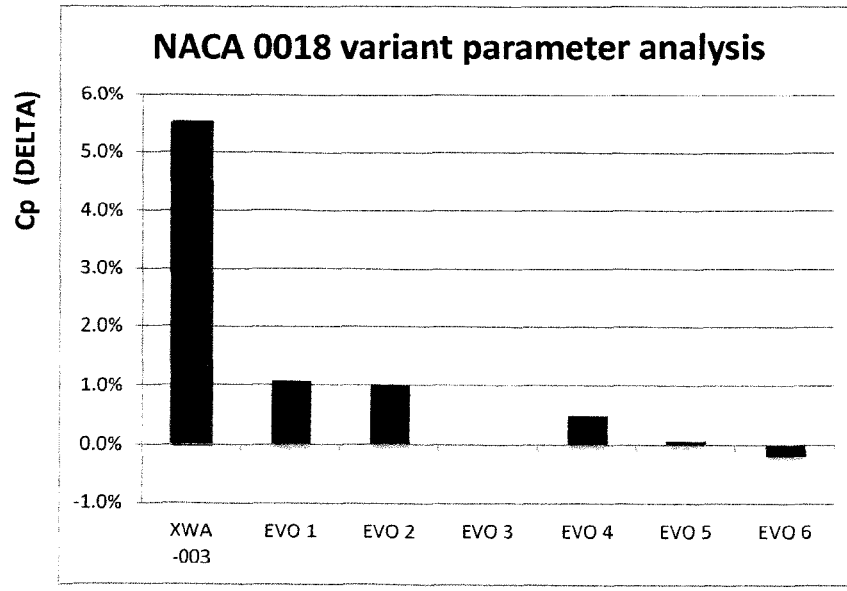
Figure 36:
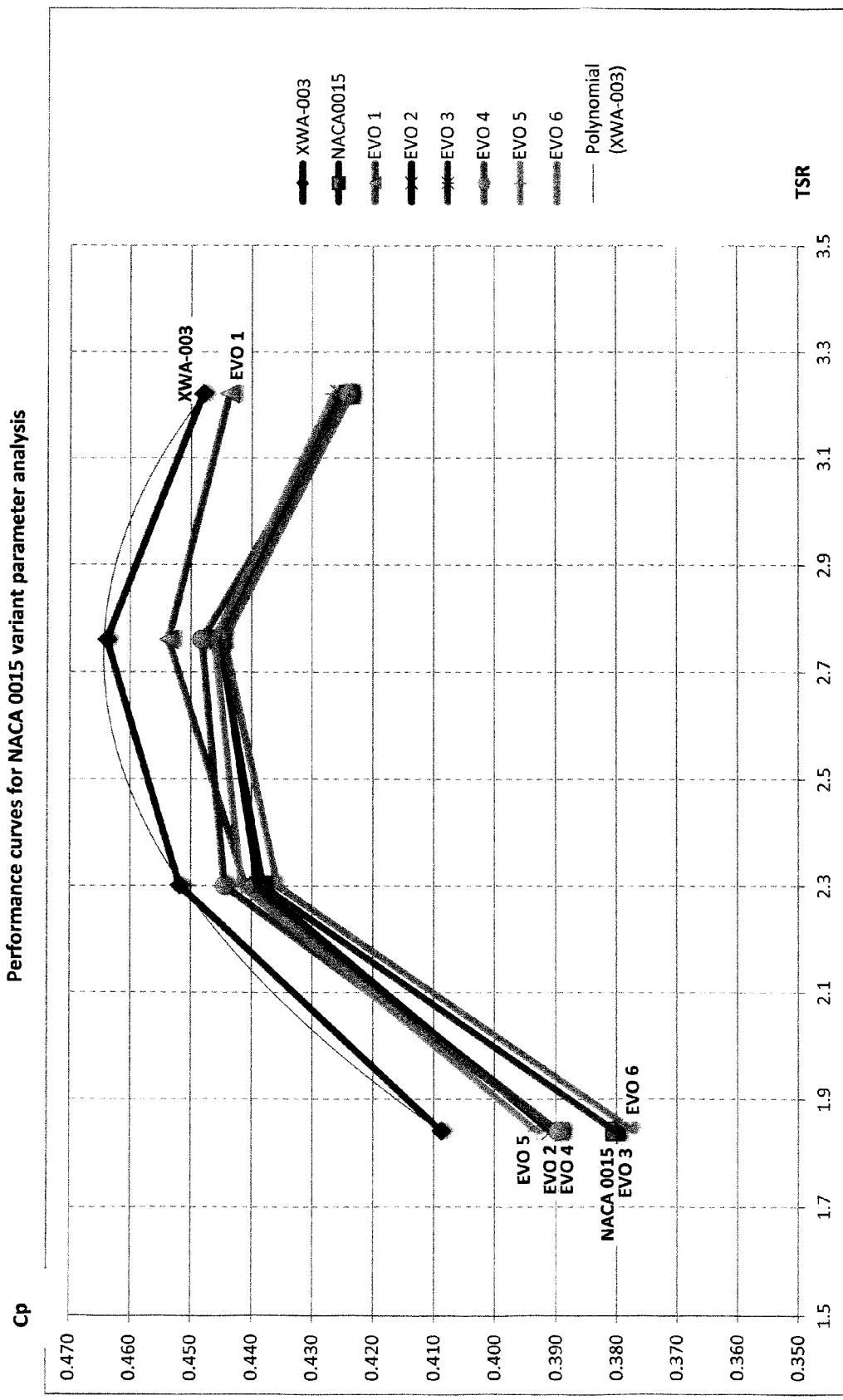
Figure 37:
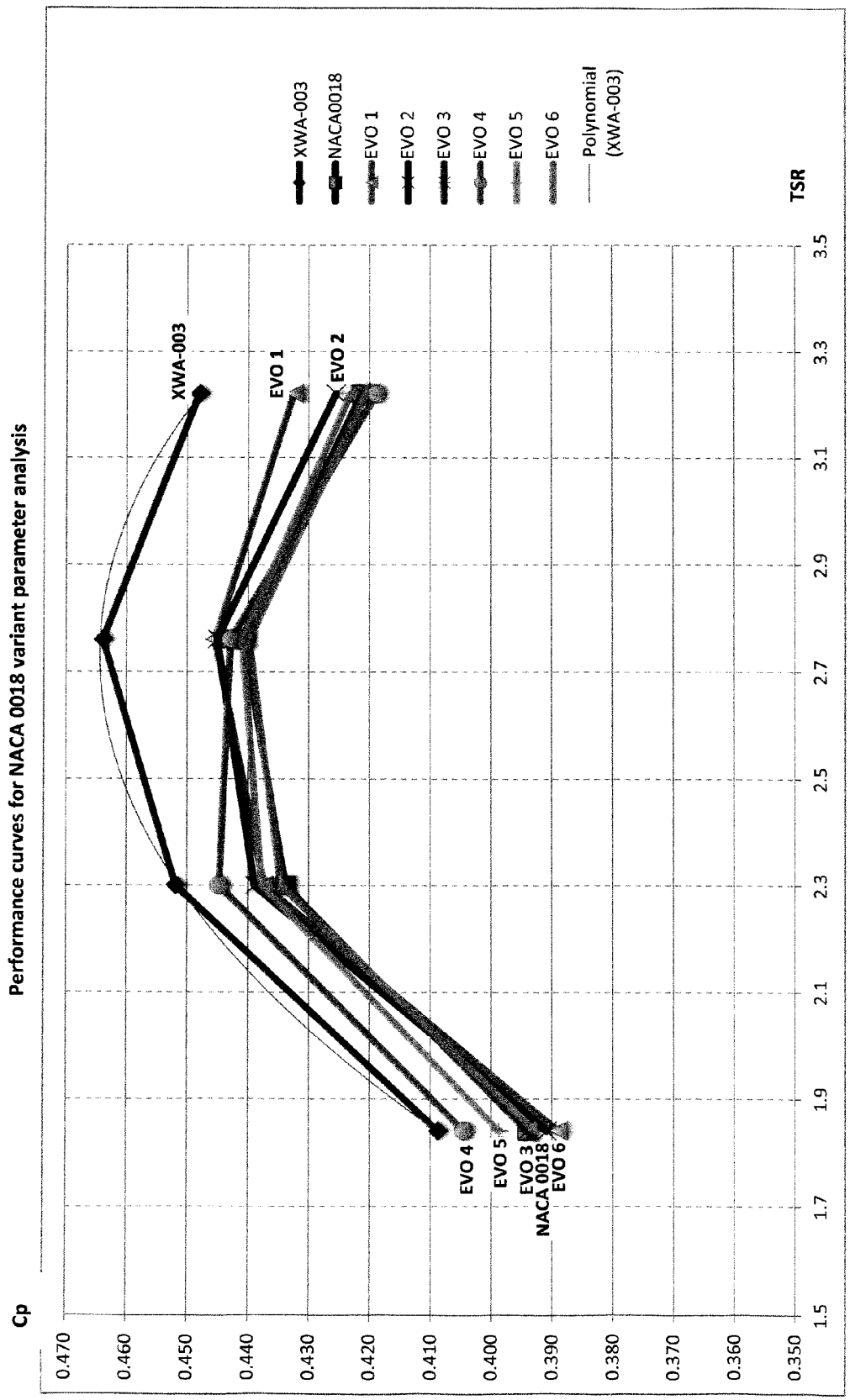

FIG. 12 shows the prior art NACA 0015 aerofoil profile;
FIG. 13 shows the prior art NACA 0018 aerofoil profile;
FIG. 14 shows the prior art Somers S 824 aerofoil profile;
FIG. 15 reproduces FIG. 20 of Travis J. Carrigan et al: "Aerodynamic Shape Optimization of a Vertical-Axis Wind Turbine Using Differential Evolution," showing a prior art optimised aerofoil profile superimposed on the NACA 0015 profile;

FIG. 16 shows the XWA-003 profile for ease of comparison;

FIG. 17 shows the XWA-003, NACA 0015, NACA 0018 and Somers S 824 profiles superimposed;

FIG. 18 shows the XWA-003 profile for ease of comparison;

FIG. 19 shows the range of variation of the leading edge curvature and trailing edge angle of the novel aerofoil profile according to the invention, taking the optimal centre point position and T/C ratio as shown in FIG. 8 and FIG. 11;

FIG. 20 shows the XWA-003 profile for ease of comparison, wherein it will be understood that the XWA-003 profile represents the optimal profile within the range illustrated in FIG. 19;

FIG. 21 shows the range as shown in FIG. 19, superimposed on the NACA 0015, NACA 0018 and Somers S 824;

FIG. 22 illustrates the values set out in Table 3, showing the efficiency (Cp) v. maximum thickness to chord length ratio (T/C) curve for the novel XWA-003 rotor;

FIG. 23 illustrates the values set out in Table 2, showing the efficiency (Cp) v. solidity ratio curve for the novel XWA-003 rotor;

FIG. 24 illustrates the values set out in Table 5, showing the efficiency (Cp) v. TSR curves for a range of XWA-003 rotors having different solidity ratios;

FIG. 25 shows the XWA-003 profile;

FIG. 26 shows the XWA-003 profile after truncation along line X2-X2 of FIG. 25;

FIG. 27 shows in broken lines the truncated XWA-003 profile of FIG. 26 after directional scaling along the chord, superimposed on the original XWA-003 profile shown in solid lines;

FIG. 28 illustrates the values of Table 6, showing how truncation and directional scaling of the XWA-003 profile affect its aerodynamic efficiency;

FIG. 29 compares the efficiency (Cp) v. TSR curves for the XWA-003 and prior art aerofoil profiles, wherein the optimal values are represented in Table 7;

FIG. 30 compares the power curves for a wind turbine having the XWA-003 and S 824 aerofoil profiles;

FIG. 31 compares the annual energy output of the respective wind turbines of FIG. 30;

FIG. 32 illustrates the CFD analysis data of Table 9, in which the efficiency (Cp) of the XWA-003 profile is compared with that of the S 824 prior art aerofoil profile, and the effect on the efficiency of the S 824 profile of varying each individual parameter of the S 824 profile to be the same value as the corresponding parameter of the XWA-003 profile is illustrated by CFD simulations EVO 1 .... EVO 6;

FIG. 33 illustrates the data of Table 10 and corresponds to FIG. 32, but comparing the XWA-003 profile with the prior art NACA 0015 aerofoil profile;

FIG. 34 illustrates the data of Table 11 and corresponds to FIG. 32, but comparing the XWA-003 profile with the prior art NACA 0018 aerofoil profile;

FIG. 35 shows the efficiency (Cp) v. TSR curves derived from the CFD analysis of Table 9 and FIG. 32 on the S 824 profile, wherein the optimum values are represented in Table 9 and FIG. 32;

FIG. 36 shows the efficiency (Cp) v. TSR curves derived from the CFD analysis of Table 10 and FIG. 33 on the NACA 0015 profile, wherein the optimum values are represented in Table 10 and FIG. 33; and FIG. 37 shows the efficiency (Cp) v. TSR curves derived from the CFD analysis of Table 11 and FIG. 34 on the NACA 0018 profile, wherein the optimum values are represented in Table 11 and FIG. 34.

In each of the figures, corresponding reference numerals indicate corresponding elements. Where curves are presented, these are generally a second order polynomial fit to the defined values. For clarity it should be noted that references "P1" and "P2" are not used.

The data presented in this specification were derived from a computational fluid dynamics (CFD) model running on Fluent® software available from Ansys® Inc., Canonsburg, Pa., USA. The model was based on a wind turbine rotor with two vertical blades arranged in parallel with the rotor axis as shown in FIG. 2, and configured to describe a cylindrical swept envelope, having a height of 19 m and a diameter D of 11 m and rotating at approximately 50-65 RPM to generate a maximum power output of 80 kW at a nominal windspeed of 8 m/s. For each CFD analysis, the turbine performance was optimised at a windspeed of 8 ms$^{-1}$ and for each configuration a tip speed ratio sweep was performed to find the optimum operating point.

Other key parameters and software settings used in the CFD model are set out in Table 1.

TABLE 1

| CFD software parameters and settings | |
|---|---|
| Software | Fluent 6 |
| Simulation Type | 2D Unsteady |
| Mesh size | 1,011,000 |
| Mesh Type | Hybrid |
| Turbulence Model | Spalart-Allmaras |
| Y+ | <1 |
| Nb point in boundary layer | 30 |
| Iterations | 9,000 |

The values predicted by the CFD analysis for the prior art aerofoils were found to correspond closely to experimental data reported in the literature.

FIG. 2 shows a wind turbine installation incorporating the XWA-003 rotor 1 having two vertical blades 2 mounted on radial struts 3 which support the blades in spaced relation in parallel with the rotating shaft 4, which is linked by a transmission 5 (which may incorporate gearing or may be simply an extension of the shaft 4) to an assembly 6 including an electrical generator and, optionally, a brake. The generator and brake are controlled by a controller 7 with a wind speed sensor 8, e.g. a cup anemometer. The controller is configured to govern the rotational speed of the rotor 1 about its axis X1 to obtain the optimal TSR depending on the sensed windspeed. The controller operates the brake as a safety device to retard the rotor or hold it stationary when required, and may also configure the generator to act as a motor so as to drive the rotor to its operating speed, at which it begins to extract energy from the windstream.

Figure 3S:
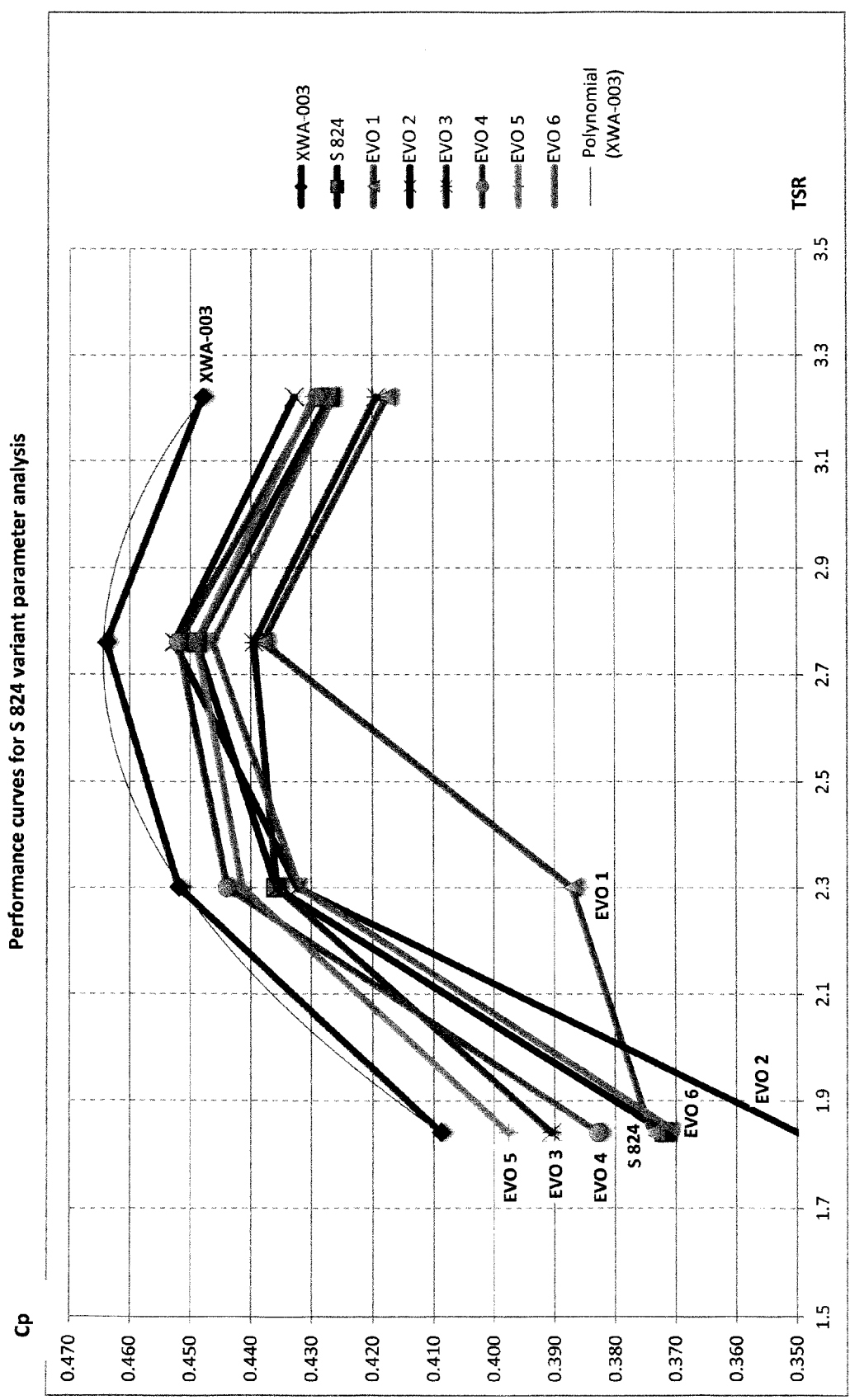
FIG. 3 shows a wind turbine installation having a cylindrical rotor with two helical blades of the novel XWA-003 profile.

FIG. 3 shows a similar installation to FIG. 2 with corresponding parts, except that the XWA-003 rotor 1' has two blades 2', each of which is curved along its length L1 around the axis of rotation, so that when considered in a static position of the rotor, the blades together extend, preferably helically, through at least most of a full revolution around the axis of rotation X1. Preferably the blades extend 360° or a multiple of 360° around the axis of rotation, which ensures that the rotor will apply an almost constant torque to the transmission as it rotates. Like the embodiment of FIG. 2, the helical blades describe a cylindrical swept envelope 9 as the rotor rotates.

FIG. 4 is a section through the rotor of FIG. 2 or FIG. 3 in the plane 10; it will be appreciated that the section will be the same, and hence the aerodynamic characteristics of the profile will be the same, irrespective of the vertical or helical configuration of the blades. For this reason, although the CFD data presented below for the XWA-003 rotor and by way of comparison also for the respective prior art rotors are based on the FIG. 2 configuration, the same data will apply equally to the helical configuration of FIG. 3. It is important to note that the section of the profile is defined in the plane 10 normal to the axis of rotation X1, which (as in FIG. 3) is not necessarily normal to the length L1 of the blade.

In both of the embodiments of FIG. 2 and FIG. 3 it will be seen that the radius R is substantially constant along at least most of the length L1 of each blade, so that the radially outermost surfaces of the blades describe a generally cylindrical swept envelope 9 about the axis of rotation which is slightly greater than the diameter D of the rotor as defined below, wherein D=2R. It will be appreciated that when considered in plan view as shown in the section of FIG. 4, the swept envelope 9 corresponds to the footprint of the rotor, which in a cylindrical configuration is ideally suited for applications where it is desired to obtain the maximum generating capacity in a limited space, e.g. a narrow corridor of land beside a railway track.

Figure 1:
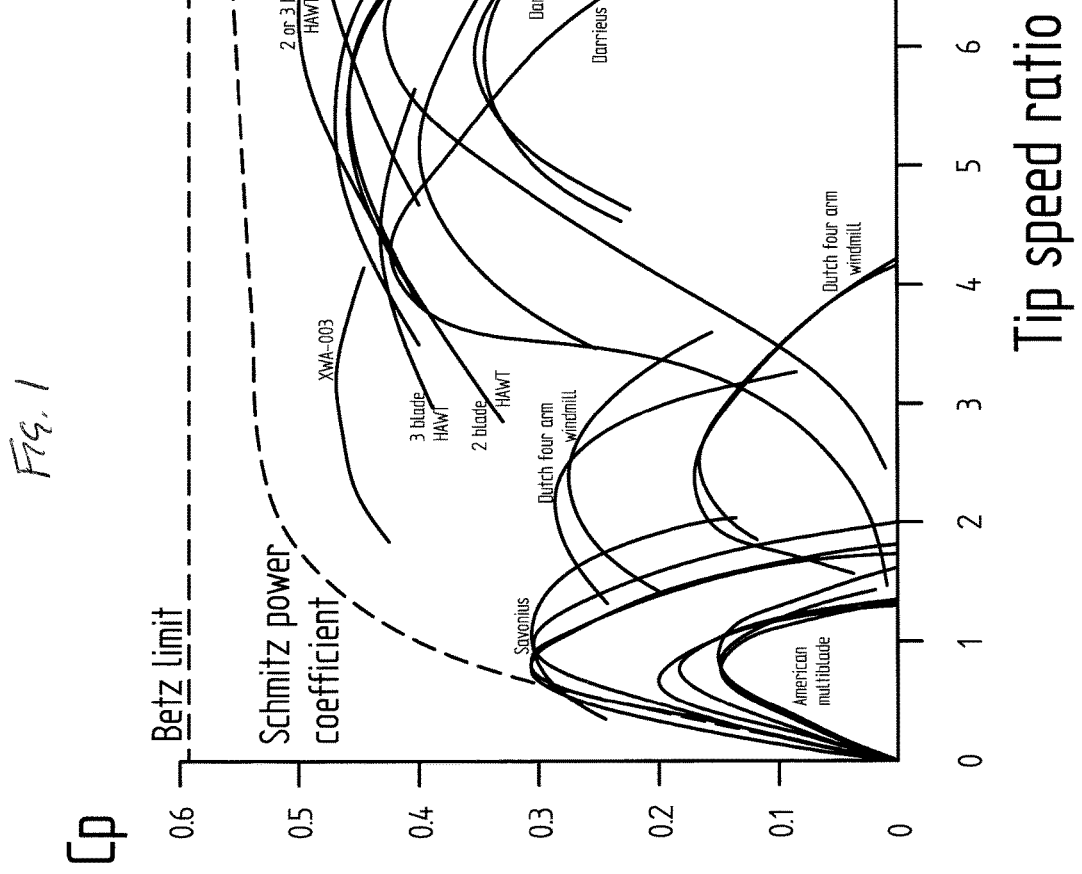

Referring for a moment to FIG. 1, it can be seen that the Darrieus rotor is operated at a higher TSR than a cylindrical XWA-003 rotor, represented by the curve in the top left-hand corner of the diagram. However, it should be understood that since the Darrieus is of non-cylindrical configuration, the quoted TSR for the Darrieus is the maximum or equatorial TSR, rather than the average TSR over the whole length of the blades.

By arranging the novel rotor to define a cylindrical swept envelope, each blade can advantageously be manufactured with a constant profile along most or all of its length while being operated at its optimal TSR. This simplifies manufacture (e.g. making it possible to mould the blade in multiple, identical sections) and reduces the cost of the rotor and hence the cost of energy over the lifetime of the wind turbine installation. (In a non-cylindrical rotor, it would be possible in theory to operate the blades at optimal TSR along the whole of their length, but only if the blade section varied continuously along the length of the blade to correspond to the relative circumference of the swept envelope at each point.)

Since the maximum TSR of a cylindrical rotor is less than that of a non-cylindrical rotor (although the average TSR may be very similar), the cylindrical rotor experiences relatively lower centrifugal stresses on the blades. This in turn means that the profile and the solidity ratio of the rotor (which may be considered as the relative slenderness of the blades compared with the overall diameter of the rotor) can both be optimised as taught herein, without needing to increase the chord length or T/C ratio to obtain a blade stiffness sufficient to withstand a higher radial loading, and also without incurring the efficiency penalties inherent in additional radial struts.

These advantages are further enhanced by a helical blade configuration, which delivers near-constant torque, minimising cyclical stress on the blades and hence minimising blade deformation and noise generation, and reducing the mechanical loading and hence the cost of the other components. A helical blade configuration also helps the rotor to self-start, and it is surprisingly found that in this configuration, the novel rotor is able to develop sufficient torque to self-start from rest, even against the constant torque resistance of a permanent magnet generator sized to suit the output and design TSR of the rotor.

Referring again to FIG. 4, the rotor blades are configured to rotate about the axis of rotation X1 in a direction as indicated by the arrow. When considered in the plane 10 normal to the axis of rotation X1 and passing through each of the blades, each of the blades has a respective section bounded by a profile defining an aerofoil, wherein the blades consist of a number N of blades, and N≥1. Preferably, N=2, as shown in the illustrated embodiments.

Where the rotor defines a cylindrical swept envelope, the solidity ratio of the rotor is defined as NC/D, wherein N is the number of blades, C is the length of the chord, and D is the diameter of the rotor as defined below. It will be appreciated that the solidity ratio is defined in a plane 10 which may be taken at any position normal to the rotation axis and passing through the blades, and so the number of blades N is defined by the number of blade sections contained in that common plane 10.

Figure 5:
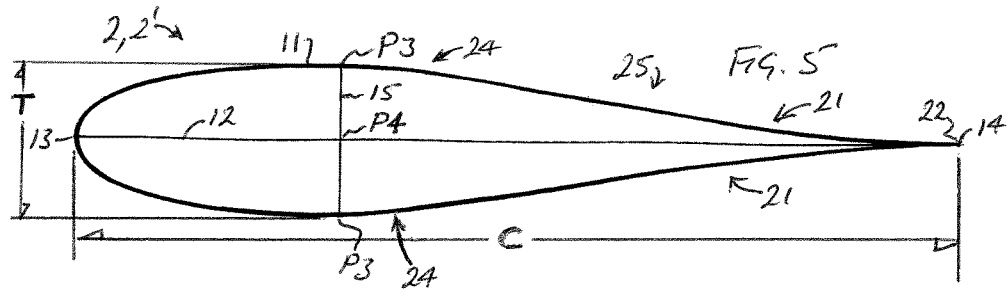
FIG. 5 shows the XWA-003 profile of one of the rotor blades in the section of FIG. 4.
Figure 6:
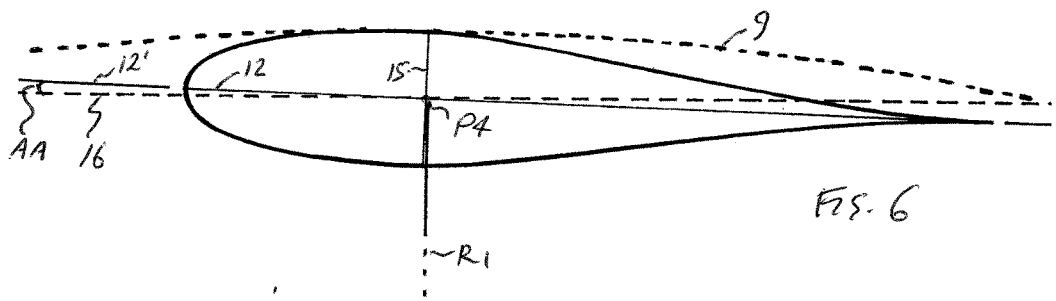
FIG. 6 illustrates the definition of the angle of attack in the XWA-003 profile of FIG. 5.

Referring also to FIG. 5, the profile of the novel aerofoil is a line 11 of zero thickness defining the outer surface of the blade section when considered in the plane 10. The profile is symmetrical about a chord 12, the chord being a first straight line of length C between a first point defining a leading edge 13 of the profile, and a second point defining a trailing edge 14 of the profile. For ease of illustration, the chord 12 is extended as line 12'.

The section has a maximum thickness T transverse to the chord 12 between opposite maximum thickness points P3 on the profile, wherein a second straight line 15 of length T between the opposite maximum thickness points P3 is normal to the chord 12 and intersects the chord at a centre point P4.

In accordance with the invention, the centre point P4 is positioned between 26% and 34% of the length C of the chord from the leading edge 13. Optimally, the position of the centre point P4 may be selected as 30% of the length C of the chord from the leading edge.

Further in accordance with the invention, the profile has a ratio of maximum thickness to chord length T/C=0.16 plus or minus an optional thickness deviation, wherein the thickness deviation is from −0.04 to +0.03. Optimally, the ratio T/C may be selected to be 0.16.

The rotor has a radius R1 of length R in the plane 10 of the profile between the axis of rotation X1 and the centre point P4, and a diameter D wherein D=2R.

The profile has an angle of attack AA, defined as an angle between the chord 12 and a third straight line 16 normal to the radius R1 and passing through the centre point P4 in the plane of the profile.

The angle of attack may be zero (0°), in which case the third straight line 16 will be collinear with the chord.

Alternatively, the angle of attack may be negative, in which case the chord 12 diverges progressively (radially) inwardly from the third straight line 16 with respect to the axis of rotation X1 from the centre point P4 to the leading edge 13 (i.e. away from the centre point P4 and towards the leading edge 13).

Alternatively, the angle of attack may be positive, in which case the chord 12 diverges progressively (radially) outwardly from the third straight line 16 with respect to the axis of rotation X1 from the centre point P4 to the leading edge 13 (i.e. away from the centre point P4 and towards the leading edge 13), as shown.

Preferably, the angle of attack is zero or positive and is no more than 4°.

The curvature of the XWA-003 profile is typical of an aerofoil in that except at the trailing edge or truncation (as further described below), the curvature is continuous and without any abrupt angular discontinuities. In other words, other than at the trailing edge or truncation, the lines defining the profile of the aerofoil on either side of any arbitrary point on the profile (for example, on either side of the maximum thickness point P3) are smoothly continuous, i.e. tangent to one another.

Figure 7:
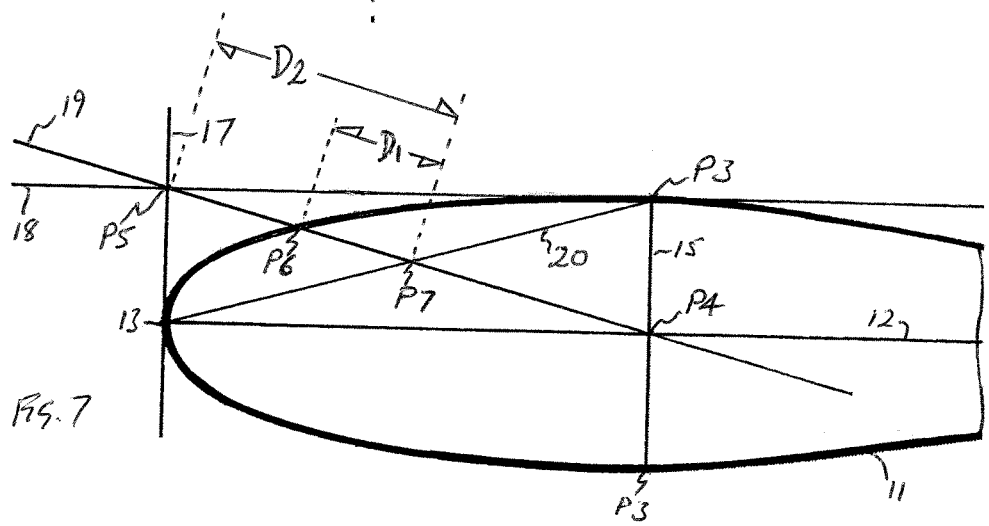
FIG. 7 illustrates the definition of the leading edge curvature in the forward part of the XWA-003 profile of FIG. 5.

Referring to FIG. 7, the curvature of the novel profile between the leading edge 13 and each maximum thickness point P3 is smooth and is defined by a leading edge curvature ratio D1/D2, as follows:—

A fourth straight line 17 normal to the chord 12 and passing through the leading edge 13 intersects a fifth straight line 18 parallel with the chord 12 and passing through a respective one of the maximum thickness points P3 at a first intersection point P5.

A sixth straight line 19 between the centre point P4 and the first intersection point P5 intersects the profile at a second intersection point P6.

A seventh straight line 20 between the leading edge 13 and the respective one of the maximum thickness points P3 intersects the sixth straight line 19 at a third intersection point P7.

D1 is defined as the distance along the sixth straight line 19 between the third intersection point P7 and the second intersection point P6, and D2 as the distance along the sixth straight line 19 between the third intersection point P7 and the first intersection point P5.

In accordance with the invention, the leading edge curvature ratio D1/D2 is from 0.42 to 0.50. Optimally, the leading edge curvature ratio may be selected to be 0.46. The range of leading edge curvature according to the invention, for the case where the centre point position and T/C ratio are optimal (P4 at 30% C from the leading edge 13, T/C=0.16), is illustrated in FIG. 8.

Referring now to FIG. 5 and FIGS. 9-11 which show the tail portion 25 of the aerofoil, the blade section in plane 10 defines on each side of the chord 12 a concavity 21 between the respective maximum thickness point P3 and the trailing edge 14, wherein respective concavely curved portions 21' of the profile defining each concavity converge towards respective rearward extremities 22 of the concavely curved portions 21' proximate the trailing edge 14. A trailing edge angle A is defined between the chord 12 and a tangent 23 of (i.e. a straight line 23 tangent to) each respective concavely curved portion 21' of the profile at its rearward extremity 22. (The tail portion 25 is taken to extend between each maximum thickness point P3 and the respective rearward extremity 22.)

In accordance with the invention, the trailing edge angle A is between 0° and 5°. Optimally, the trailing edge angle may be selected to be 0°, in which case the tangent line 23 to each concavely curved portion 21' at its rearward extremity 22 will be collinear with the chord 12 (where the profile tapers to a point so that the rearward extremities 22 are coincident with the trailing edge 14), or otherwise parallel with the chord 12 (where the profile is truncated).

Figure 9:
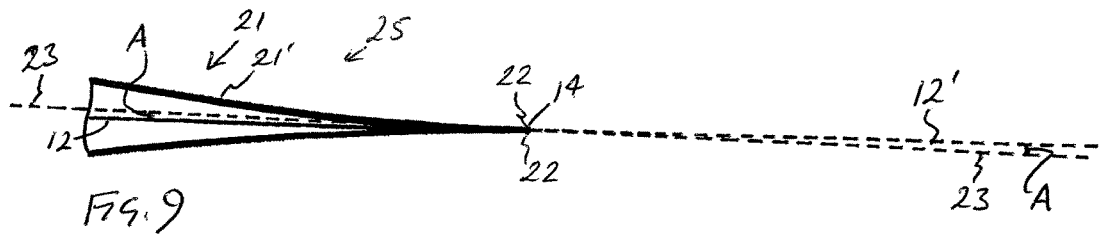
FIG. 9 illustrates the definition of the trailing edge angle A in the XWA-003 profile of FIG. 5.
Figure 10:
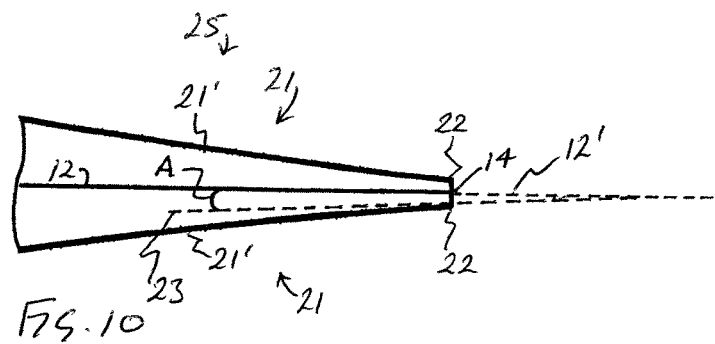
FIG. 10 illustrates the definition of the trailing edge angle A in a truncated variant of the XWA-003 profile of FIG. 5.

In FIG. 9 the concavely curved portions extend to the trailing edge 14 so that their respective rearward extremities 22 are coincident with the trailing edge 14. FIG. 10 illustrates how the trailing edge angle is derived for a flat back (truncated) aerofoil, as further described below, wherein the rearward extremities 22 of the respective concavely curved portions 21' are separated by the width of the truncated tail, with the trailing edge 14 being a point mid-way between them.

FIG. 11 illustrates the range of trailing edge angles according to the invention, for the case where the centre point position and T/C ratio are optimal (P4 at 30% C from the leading edge 13, T/C=0.16).

Referring again to FIG. 5, it can be seen that the optimal (XWA-003) profile is normal to the chord 12 at the leading edge point 13, and parallel with the chord at each maximum thickness point P3. Except for the trailing edge point or truncation at its rearmost end (and so along the whole of the profile forward of the rearward extremities 22) the profile has continuous smooth curvature, which is entirely convex except for a single smooth concavity 21 on each side of the tail portion 25.

It will be understood therefore that the novel profile defines on each side of the chord between the leading edge 13 and the rearward extremities 22 not more than one inflection (i.e. not more than one change of curvature from convex to concave), which is located between the maximum thickness point P3 and the respective concavity 21. The two inflections are indicated by reference numerals 24.

The XWA-003 profile is obtained by defining the continuous curvature of the profile forward of the rearward extremities 22 so as to minimise the rate of angular change, or sharpness of curvature, at all points along its length, whereby the average rate of angular change, or sharpness of curvature, is also minimised along the whole of its length. In other words, the optimal profile is the smoothest possible curve fitting the defined constraints.

This smoothest possible curve may be constructed in the traditional manner using a spline (a strip of flexible, elastic material) as known in the art of technical drawing, as may readily be demonstrated by applying such a strip to the profile depicted in FIG. 5 or FIG. 18.

The curvature of the tail portion 25 for example can therefore be regarded as the smoothest possible curve which is parallel with the chord at the maximum thickness points P3 and which defines the stated trailing edge angle at the rearward extremities 22.

Instead of using a mechanical spline, the novel profile may be generated more conveniently from the defined values set out herein using a mathematical spline function within a computer aided design (CAD) tool. If the CAD tool defines curvature using a tension spline function, then it may allow the modification of tension factors for each defined point of the curve so as to modify the local rate of angular change, or sharpness of curvature, of the portion of the curve between that point and the next. However, this additional complexity is not necessary in order to define the optimal (XWA-003) profile.

In defining the XWA-003 profile using such a CAD package, the defined tension factors were uniform throughout. Thus the tension factors at the maximum thickness points P3 and at the trailing edge 14, which define the rate of angular change of the curve in the tail portion 25, were equal, each having a default value of 1, so as to define the smoothest possible curve. Although not essential to generate the novel aerofoil, these tension values are included for reference in tables 7, 9, 10 and 11. If desired, they may be modified (using a suitable CAD tool) so as to move the curve slightly away from the minimal rate of angular change or sharpness of curvature defined by this optimal (XWA-003) baseline case. In practice however, modifying these tension factors is found to have a relatively minor effect on the efficiency of the novel aerofoil.

A rotor according to the invention may be designed by the following method:—

The rotor diameter and the number and configuration of the blades is first determined based on the intended application, with a two-bladed rotor having a helical blade configuration with a cylindrical swept envelope being generally preferred for applications where it is desired to obtain maximum power output in a compact configuration.

The chord length of each blade can then be calculated to obtain the desired solidity ratio NC/D, which for a rotor defining a cylindrical swept envelope is preferably in the range from 0.125 to 0.270 (in which range an efficiency Cp approximately ≥0.45 may be achieved), more preferably from 0.145 to 0.235 (in which range an efficiency Cp≥0.46 may be achieved), with the highest efficiency (Cp=0.469) being achieved at a solidity ratio of 0.174, as shown in Table 2 and FIG. 23 for the case where the remaining parameters are selected in accordance with the optimal (XWA-003) embodiment.

TABLE 2

Showing the effect on Cp of varying the solidity ratio, where remaining parameters are optimal

| Solidity Ratio | 0.113 | 0.119 | 0.126 | 0.133 | 0.141 | 0.151 | 0.161 |
|---|---|---|---|---|---|---|---|
| Cp | 0.441 | 0.448 | 0.453 | 0.456 | 0.458 | 0.463 | 0.466 |
| Cp (DELTA) | −5.16% | −3.66% | −2.58% | −1.94% | −1.51% | −0.43% | 0.22% |
| Solidity Ratio | 0.174 | 0.188 | 0.205 | | 0.226 | 0.249 | 0.271 |
| Cp | 0.469 | 0.465 | 0.465 | | 0.465 | 0.454 | 0.449 |
| Cp (DELTA) | 0.86% | Optimum | Optimum | | Optimum | −2.37% | −3.44% |

Table 3 and FIG. 22 show the range of efficiency Cp which is obtained by varying the value of T/C when the remaining parameters are optimised to correspond to the preferred values of the XWA-003 embodiment. It will be seen that the ratio T/C can be varied by the optional thickness deviation from −0.04 to +0.03 while achieving an efficiency Cp of at least 0.45 at the upper and lower limits of the resulting range of values for T/C of 0.12 to 0.19.

Preferably, the thickness deviation is from −0.025 to +0.01, i.e. T/C is from 0.135 to 0.17, which can be seen to correspond approximately to an efficiency Cp≥0.458 where the remaining parameters are optimised.

Surprisingly however, although the other parameters are complexly interdependent, the optimal ratio T/C is found to be exactly or very close to 0.16, irrespective of the values of the other parameters. The designer of a rotor in accordance with the invention, wishing to vary the remaining parameters within the stated ranges, may therefore select a value of T/C=0.16 as a starting point, which considerably simplifies the design problem.

Optimal efficiency may be obtained by selecting the preferred values for the centre point position, trailing edge angle and leading edge curvature ratio, which is to say, those values corresponding to the optimal (XWA-003) embodiment, which are:
Centre point position: 30% C from the leading edge 13.
Trailing edge angle: 0°.
Leading edge curvature ratio D1/D2=0.46.

However, it is possible to vary these values in combination within the stated ranges, and as shown in Table 4, it is found that where the remaining parameters (T/C ratio, solidity ratio, and angle of attack) are optimised, an efficiency Cp in excess of 0.45 is obtained for any combination of values of these three parameters within the stated ranges.

Performance towards the upper end of the Cp range may be obtained by selecting a trailing edge angle A between 0° and 2.5°; the centre point P4 position between 28% and 32% of the length C of the chord from the leading edge; and the leading edge curvature ratio D1/D2 from 0.44 to 0.48.

Finally, after determining the values of the above mentioned parameters, the angle of attack AA may be optimised

TABLE 3

Showing the effect on Cp of varying T/C, where remaining parameters are optimal

| T/C Ratio | 12.00% | 14.00% | 15.00% | 15.50% | 16.00% | 16.50% | 17.00% | 18.00% | 20.00% |
|---|---|---|---|---|---|---|---|---|---|
| Cp | 0.45 | 0.462 | 0.462 | 0.462 | 0.465 | 0.459 | 0.458 | 0.454 | 0.442 |
| Cp (DELTA) | −3.23% | −0.65% | −0.65% | −0.65% | Optimum | −1.29% | −1.51% | −2.37% | −4.95% |

TABLE 4

Showing the effect on Cp of varying three key parameters of the novel profile in combination, where remaining parameters are optimal

| Centre point position (% C) | Trailing edge angle A (degrees) | Leading edge curvature ratio D1/D2 | Cp | Cp (DELTA) |
|---|---|---|---|---|
| 30 | 0 | 0.46 | 0.465 | Optimum |
| 30 | 5 | 0.46 | 0.459 | −1.29% |
| 30 | 0 | 0.42 | 0.463 | −0.43% |
| 30 | 0 | 0.5 | 0.459 | −1.29% |
| 30 | 5 | 0.42 | 0.458 | −1.51% |
| 30 | 5 | 0.5 | 0.457 | −1.72% |
| 26 | 0 | 0.46 | 0.464 | −0.22% |
| 26 | 5 | 0.46 | 0.459 | −1.29% |
| 26 | 0 | 0.42 | 0.462 | −0.65% |
| 26 | 0 | 0.5 | 0.460 | −1.08% |
| 26 | 5 | 0.42 | 0.460 | −1.08% |
| 26 | 5 | 0.5 | 0.460 | −1.08% |
| 34 | 0 | 0.46 | 0.457 | −1.72% |
| 34 | 5 | 0.46 | 0.456 | −1.94% |
| 34 | 0 | 0.42 | 0.459 | −1.29% |
| 34 | 0 | 0.5 | 0.457 | −1.72% |
| 34 | 5 | 0.42 | 0.456 | −1.94% |
| 34 | 5 | 0.5 | 0.453 | −2.58% | by trial and error experimentation using either a CFD analysis programme or a physical model. It will be understood that for a vertical bladed rotor, the angle of attack can be varied by rotating the blade about its length axis without affecting any of the other parameters, which means that finding the optimal angle of attack by either method is a fairly straightforward problem. If a physical model is preferred, then, since the blade configuration does not affect the aerodynamics of the profile when considered in a plane normal to the rotation axis, a vertical bladed model can most easily be used to determine the optimum angle of attack for a helical rotor. Preferably the angle of attack AA is zero or positive and is in the range from 0° to 4°.

For the optimal (XWA-003) embodiment, maximum efficiency is found at a positive angle of attack AA=3.5°.

For ease of comparison, FIGS. 12-16 illustrate the XWA-003 profile beside the corresponding profiles of a range of prior art aerofoils which (as already noted) were selected for their overall similarity to the novel profile, and in the case of FIG. 15 to give one example of the range of possible outcomes of an automated, stochastic parameter variation and CFD modelling approach to the VAWT aerofoil design problem. It will be noted that the novel profile may be distinguished visually from the prior art aerofoils, inter alia by the marked concavity at the tail and the relatively smaller trailing edge angle.

This can be seen more easily in FIGS. 17-18 in which the XWA-003 profile is juxtaposed with and superimposed on the three principal prior art aerofoils.

FIGS. 19-21 help to illustrate the novel profile in comparison with the prior art aerofoils, showing the range of possible values for the trailing edge angle and leading edge curvature ratio within the scope of the invention for the case where the centre point (P4) position and the maximum thickness to chord length (T/C) ratio are optimal, as shown in FIGS. 8 and 11.

Table 5 presents a range of values derived from the CFD analysis for the aerodynamic efficiency (Cp) of the XWA-003 aerofoil, wherein the performance of the novel aerofoil was assessed through a wide range of solidity ratios by altering the chord length at a constant thickness over chord (T/C) ratio. The same values are represented graphically in FIG. 24. The figures show how aerodynamic efficiency (Cp) varies with tip speed ratio (TSR) for each of a range of rotors equipped with the XWA-003 aerofoil but having different respective solidity ratios in the range from 0.113 to 0.271.

TABLE 5

Effect of solidity ratio on aerodynamic efficiency (Cp) of the XWA-003

| | Solidity Ratio | | | | | | |
|---|---|---|---|---|---|---|---|
| TSR | 0.113 | 0.119 | 0.126 | 0.133 | 0.141 | 0.151 | 0.161 |
| 1.840 | | | | | | | |
| 2.300 | | | | | | | 0.418 |
| 2.760 | | | | | 0.438 | 0.447 | 0.454 |
| 3.220 | 0.428 | 0.437 | 0.445 | 0.452 | 0.458 | 0.463 | 0.466 |
| 3.701 | 0.441 | 0.448 | 0.453 | 0.456 | 0.458 | 0.460 | 0.458 |
| 4.140 | 0.437 | 0.442 | 0.445 | 0.446 | 0.445 | | |

| | Solidity Ratio | | | | | |
|---|---|---|---|---|---|---|
| TSR | 0.174 | 0.188 | 0.205 | 0.226 | 0.249 | 0.271 |
| 1.840 | 0.355 | | | 0.409 | 0.418 | 0.425 |
| 2.300 | 0.430 | 0.439 | 0.445 | 0.452 | 0.454 | 0.449 |
| 2.760 | 0.460 | 0.464 | 0.464 | 0.464 | 0.452 | 0.436 |
| 3.220 | 0.469 | 0.465 | 0.459 | 0.448 | 0.432 | 0.408 |
| 3.701 | 0.454 | 0.449 | 0.437 | | | |
| 4.140 | | | | | | |

Optimal efficiency is obtained by governing the XWA-003 rotor at the optimal TSR for its solidity ratio NC/D.

Preferably, the controller is arranged to govern the rotor at a tip speed ratio selected within a range from 2.25 to 4.00, which for the XWA-003 rotor corresponds to a Cp in excess of 0.45 when an optimal solidity ratio (corresponding to the broken line Aggregate curve in FIG. 24) is selected from the range of different solidity ratios represented in Table 5 and FIG. 24 to correspond to the selected TSR. More preferably, the controller is arranged to govern the rotor at a tip speed ratio from 2.61 to 3.70, corresponding to a Cp in excess of 0.46 at an optimal solidity ratio. Most preferably, the controller is arranged to govern the rotor at a tip speed ratio from 2.76 to 3.50, corresponding to a Cp in excess of 0.465 at an optimal solidity ratio.

It will be noted that for each solidity ratio, and hence for any one rotor, the Cp curve is fairly broad. For example, a rotor of solidity ratio 0.174 achieves a maximum Cp of 0.469 at TSR=3.220, and delivers a Cp≥0.450 in a fairly broad range of TSR from about 2.61 to about 3.82 (this latter value being projected slightly beyond the end of the values indicated). A rotor of solidity ratio 0.188 achieves a maximum Cp of 0.465 at TSR=3.220, and delivers a Cp≥0.450 in a fairly broad range of TSR from about 2.51 to about 3.67.

The Cp achievable at the optimal tip speed ratio for each of the range of rotors is represented in FIG. 24 by the dashed line curve marked "Aggregate". This curve is a rough approximation (rather than a $2^{nd}$ order polynomial fit as in the other graphs) and is reproduced as the curve marked "XWA-003" in FIG. 1. It will be understood therefore that this curve represents approximately the optimal Cp achievable by a range of VAWT rotors, each rotor being equipped with the XWA-003 aerofoil and governed at the optimal TSR for its respective solidity ratio.

Although FIG. 1 is based on widely varying figures from a variety of different authors, it serves to illustrate that the efficiency range of the novel rotor (from Cp=0.45 up to Cp=0.469) lies above the maximum values considered achievable by any of those authors by a conventional Darrieus rotor, and towards the upper limits of the higher ranges of maximum values considered achievable by some authors by a 2- or 3-bladed HAWT, with some of the HAWT distributions indicated by other authors lying substantially below this range.

The significance of this efficiency improvement for the economic competitiveness of the novel rotor for commercial electricity generation will be further discussed below.

In this specification, the novel profile is generally illustrated as tapering at the tail towards a single point which defines the trailing edge 14. Although the aerofoil is most easily designed in this way, it is difficult in practice to manufacture a trailing edge of zero thickness, and so after defining the geometry of the profile, the tail of the profile will usually be truncated along a truncation line X2-X2 as shown in FIG. 25, to produce a truncated or "flat back" aerofoil as shown in FIG. 26. The resulting aerofoil is easier to manufacture and more robust in service. The truncation preferably defines a rearwardly facing surface which is preferably flat and normal to the chord 12, although it may of course be angled or rounded if desired.

Table 6 and FIG. 28 show the effect of truncation on the efficiency of the XWA-003 profile, wherein it will be seen that the efficiency of the optimal profile is reduced from 0.465 to a value of at least Cp=0.449 by truncating at a line X2-X2 which intersects the chord 12 at a position not more than 10% of the chord length (0.1 C) from the trailing edge 14.

TABLE 6

Showing the effect on Cp of truncating the XWA-003, with and without directional scaling

| Truncation (% C) | −20.00% | −10.00% | −5.00% | −2.50% | 0.00% |
|---|---|---|---|---|---|
| Cp (truncated) | 0.431 | 0.449 | 0.456 | 0.460 | 0.465 |
| Cp (truncated) (DELTA) | −7.31% | −3.44% | −1.94% | −1.08% | Optimum |
| Cp (stretched) | 0.444 | 0.450 | 0.457 | 0.465 | 0.465 |
| Cp (stretched) (DELTA) | −4.52% | −3.23% | −1.72% | 0.00% | Optimum |

More preferably, the profile may be directionally scaled (stretched) along the chord 12 after truncation, so that the leading edge 13 is held in position while the trailing edge 14 is moved back to its original position. The resulting stretched profile (shown in broken lines in FIG. 27) is very similar to the original profile (shown in solid lines in FIG. 27 for comparison), and as shown in Table 6, the efficiency of the truncated aerofoil is moved back towards its original value, so that after directional scaling, no diminution in efficiency (Cp to three decimal places) is observed after truncation at a position up to 2.5% C from the trailing edge.

Referring to Table 7, the values of the respective parameters defining the optimal XWA-003 profile are compared with the corresponding parameter values for each of the three selected prior art aerofoils, together with the relative efficiency of each aerofoil at its respective optimum TSR. It will be seen that of the three prior art aerofoils, the S 824 is closest in efficiency to the XWA-003.

FIG. 31 presents the resulting annual power output of each of the turbines.

Table 8 presents an economic analysis of an 80 kW wind turbine installation incorporating the XWA-003 rotor as against a comparable installation incorporating the "S 824 (CFD study)" rotor, based on the power output figures presented in FIGS. 30 and 31.

The analysis assumes for each installation an annual mean wind speed of 6.5 m/s and a nominal initial capital investment of GBP (GB pounds sterling) 250,000 amortized over 4 years, with an average basic sale price of GBP 0.05 per

TABLE 7

Aerofoil Comparison

| AEROFOIL | | XWA-003 | S 824 | DELTA | NACA 0015 | DELTA | NACA 0018 | DELTA |
|---|---|---|---|---|---|---|---|---|
| Control Parameters | | | | | | | | |
| Chord Length (C) | mm | 1243 | 1243 | 0.0% | 1243 | 0.0% | 1243 | 0.0% |
| Angle of attack | degrees | 3.5 | 0 | 100.0% | 0 | 100.0% | 0 | 100.0% |
| Thickness to chord ratio (T/C) | — | 16.0 | 18.0 | −11.1% | 15.0 | 6.7% | 18.0 | −11.1% |
| Centre point position | % C | 30 | 38.5 | −22.1% | 30 | 0.0% | 30 | 0.0% |
| Trailing edge angle A | degrees | 1 | 10.243 | −90.2% | 10 | −90.0% | 12 | −91.7% |
| Leading edge curvature ratio (D1/D2) | — | 0.46 | 0.35 | 31.4% | 0.4 | 15.0% | 0.4 | 15.0% |
| Tail tension at maximum thickness points P3 | — | 1 | 0.65 | 53.8% | 0.5 | 100.0% | 0.5 | 100.0% |
| Tail tension at trailing edge | — | 1 | 1 | 0.0% | 1 | 0.0% | 1 | 0.0% |
| Performance | | | | | | | | |
| Optimum TSR | | 2.76 | 2.75 | −0.4% | 2.7 | −2.2% | 2.7 | −2.2% |
| Aerodynamic Efficiency (Cp) | | 0.465 | 0.449 | −3.6% | 0.445 | −4.5% | 0.441 | −5.4% |

FIG. 29 compares the Cp v. TSR curve for the XWA-003 profile with those of the prior art S 824, NACA 0015 and NACA 0018 profiles. As noted above with reference to Table 5 and FIG. 24, but better illustrated in FIG. 29, it can be seen that in its upper (optimal) region, the XWA-003 efficiency curve is not only significantly higher but also discernibly broader and flatter than those of the other aerofoils, particularly the S 824 and the NACA 0015. Of the three prior art aerofoils, the NACA 0018 has the flattest and broadest Cp v. TSR curve, but also has the lowest overall efficiency.

The combination of high efficiency with a broad efficiency curve is particularly useful for wind generators installed in locations which experience continual, rapid fluctuations in windspeed. Since the control system takes time to adjust the rotor speed to the optimal TSR corresponding to the momentary sensed windspeed, the rotor will typically operate in a band on either side of the optimal TSR. The more rapid the fluctuations in windspeed, the broader this band will be. The broad Cp v. TSR curve of the novel aerofoil means that the rotor is easier to control and can deliver a higher mean efficiency in such conditions.

Referring to Hg. 30, the power curves of comparable 80 kW wind turbines having rotors respectively with the XWA-003 aerofoil profile in a blade configuration defining a cylindrical swept envelope, and the prior art S 824 aerofoil profile, are compared across a range of wind speed. To better illustrate the performance improvement of the novel aerofoil as against that of the S 824 aerofoil, two power curves are shown for the S 824 aerofoil, wherein "S 824 (reported performance)" is based on the actual performance data reported in the Sandia literature for a test rotor with S 824 blades approximating a troposkien configuration, and "S 824 (CFD study)" is derived from a CFD analysis based on a rotor having an S 824 aerofoil profile with an optimal chord length and a blade configuration defining a cylindrical swept envelope.

kWh of energy generated, an average basic buy price of GBP 0.09 per kWh (also called avoided cost of energy), average operation and maintenance costs of GBP 6,500 per annum, a government subsidy of GBP 0.177 per kWh produced, a general cost inflation rate of 1% per annum, and an energy cost inflation rate of 4% per annum.

TABLE 8

FINANCIAL SUMMARY

| | XWA-003 | S824 | DELTA (GBP) | DELTA (%) |
|---|---|---|---|---|
| Investment (GBP) | 250,000 | 250,000 | | |
| Earnings (GBP per kWh) | −0.064 | −0.054 | 0.01 | −16% |
| Net present value (GBP) over 20 years | 360,976 | 312,709 | −48,266 | −13% |
| Net present value (GBP) over 5 years | −12,600 | −29,287 | −16,686 | 132% |
| Cost of Energy (GBP per kWh) | 0.13 | 0.14 | 0.01 | 8% |

It can be seen that over 20 years of operation of the XWA-003 installation, the levelised cost of energy without taking into account government subsidies is GBP 0.13 per kWh as against GBP 0.14 per kWh for the S 824 installation, a significant improvement. When taking into consideration government subsidies, the cost of energy becomes an earning which equates to GBP 0.064 per kWh for the XWA-003 installation against GBP 0.054 per kWh for the 5824. Earnings are added annually to total investment to generate the Net Present Value (NPV) taking a weighted average cost of capital of 7%. In this scenario the break-even point for the XWA-003 installation is at about 5 years.

It can be seen that the efficiency improvement represented by the novel aerofoil translates into a significant economic advantage, and the business case for the XWA-003 installation is found to be highly competitive with a modern HAWT installation of comparable output, with an internal rate of return in excess of 20% after 20 years.

On this analysis, if both the XWA-003 and the S824 rotors were to be compared on the same 80 kW size installation, it can be seen that the XWA-003 rotor would offer up to an additional 30 MWh of energy production per annum resulting in GBP 50,000 better Project Net Present Value after 20 years, and more importantly a cost of energy lower by GBP 0.01 per KWh, wherein the prior art installation represents an 8% higher cost of energy.

It should be noted that although this analysis takes account of the higher optimal Cp of the XWA-003 rotor, it does not take into account its relatively flatter Cp v. TSR curve, and so a somewhat greater efficiency gain and economic advantage may be obtained when the novel rotor is installed in locations characterised by rapid and continual fluctuations in windspeed.

It should also be noted that, whereas the efficiency Cp of the novel aerofoil (and of the prior art aerofoils) is calculated throughout this specification based on a nominal windspeed of 8 m/s, its Cp increases with windspeed. Thus for example, at a windspeed of 13 m/s the XWA-003 aerofoil is calculated to deliver a Cp very close to 0.50.

For better appreciation of the nature of the VAWT aerofoil design problem underlying the present invention, Tables 9-11 present an comparative CFD analysis of three respective prior art rotors, each having a respective one of the selected prior art aerofoils (the S 824, NACA 0015, and NACA 0018) with an optimal solidity ratio and an angle of attack of 0°. The windspeed is assumed to be 8 m/s.

TABLE 9

S 824 variant parameter analysis

| AEROFOIL | | XWA-003 | S 824 | EVO 1 | EVO 2 | EVO 3 | EVO 4 | EVO 5 | EVO 6 |
|---|---|---|---|---|---|---|---|---|---|
| Control Parameters | | | | | | | | | |
| Length | mm | 1243 | 1243 | 1243 | 1243 | 1243 | 1243 | 1243 | 1243 |
| Angle of attack | degrees | 3.5 | 0 | 3.5 | 0 | 0 | 0 | 0 | 0 |
| Thickness to chord ratio T/C | — | 16.0 | 18.0 | 18.0 | 16.0 | 18.0 | 18.0 | 18.0 | 18.0 |
| Centre point position | % C | 30 | 38.5 | 38.5 | 38.5 | 30 | 38.5 | 38.5 | 38.5 |
| Trailing edge angle A | degrees | 1 | 10.24 | 10.24 | 10.24 | 10.24 | 1 | 10.24 | 10.24 |
| Leading edge curvature ratio (D1/D2) | — | 0.46 | 0.35 | 0.35 | 0.35 | 0.35 | 0.35 | 0.46 | 0.35 |
| Tail tension at Max thickness | — | 1 | 0.65 | 0.65 | 0.65 | 0.65 | 0.65 | 0.65 | 1 |
| Tail tension at Trailing edge | — | 1 | 1 | 1 | 1 | 1 | 1 | 1 | 1 |
| Performance | | | | | | | | | |
| Optimum TSR | | 2.76 | 2.76 | 3.2 | 2.76 | 2.6 | 2.6 | 2.6 | 2.76 |
| Efficiency | | 0.47 | 0.449 | 0.438 | 0.453 | 0.44 | 0.452 | 0.449 | 0.446 |
| Performance Delta to S 824 baseline | | | | | | | | | |
| Optimum TSR (DELTA) | | 0.0% | | 15.9% | 0.0% | −5.8% | −5.8% | −5.8% | 0.0% |
| Efficiency (DELTA) | | 3.6% | | −2.4% | 0.9% | −2.0% | 0.7% | 0.0% | −0.7% |

TABLE 10

NACA 0015 variant parameter analysis

| AEROFOIL | | XWA-003 | NACA 0015 | EVO 1 | EVO 2 | EVO 3 | EVO 4 | EVO 5 | EVO 6 |
|---|---|---|---|---|---|---|---|---|---|
| Control Parameters | | | | | | | | | |
| Length | mm | 1243 | 1243 | 1243 | 1243 | 1243 | 1243 | 1243 | 1243 |
| Angle of attack | degrees | 3.5 | 0 | 3.5 | 0 | 0 | 0 | 0 | 0 |
| Thickness to chord ratio T/C | — | 16.0 | 15.0 | 15.0 | 16.0 | 15.0 | 15.0 | 15.0 | 15.0 |
| Centre point position | % C | 30 | 30 | 30 | 30 | 30 | 30 | 30 | 30 |
| Trailing edge angle A | degrees | 1 | 10 | 10 | 10 | 10 | 1 | 10 | 10 |
| Leading edge curvature ratio (D1/D2) | — | 0.46 | 0.4 | 0.4 | 0.4 | 0.4 | 0.4 | 0.46 | 0.4 |
| Tail tension at Max thickness | — | 1 | 0.5 | 0.5 | 0.5 | 0.5 | 0.5 | 0.5 | 1 |
| Tail tension at Trailing edge | — | 1 | 1 | 1 | 1 | 1 | 1 | 1 | 1 |
| Performance | | | | | | | | | |
| Optimum TSR | | 2.76 | 2.7 | 2.8 | 2.7 | 7.7 | 2.6 | 2.6 | 2.7 |
| Efficiency | | 0.47 | 0.445 | 0.454 | 0.445 | 0.445 | 0.448 | 0.446 | 0.445 |
| Performance Delta to NACA 0015 baseline | | | | | | | | | |
| Optimum TSR (DELTA) | | 2.2% | | 3.7% | 0.0% | 185.2% | −3.7% | −3.7% | 0.0% |
| Efficiency (DELTA) | | 4.5% | | 2.0% | 0.0% | 0.0% | 0.7% | 0.2% | 0.0% |

TABLE 11

NACA 0018 variant parameter analysis

| AEROFOIL | | XWA-003 | NACA 0018 | EVO 1 | EVO 2 | EVO 3 | EVO 4 | EVO 5 | EVO 6 |
|---|---|---|---|---|---|---|---|---|---|
| Control Parameters | | | | | | | | | |
| Length | mm | 1243 | 1243 | 1243 | 1243 | 1243 | 1243 | 1243 | 1243 |
| Angle of attack | degrees | 3.5 | 0 | 3.5 | 0 | 0 | 0 | 0 | 0 |
| Thickness to chord ratio T/C | — | 16.0 | 18.0 | 18.0 | 16.0 | 18.0 | 18.0 | 18.0 | 18.0 |
| Centre point position | % C | 30 | 30 | 30 | 30 | 30 | 30 | 30 | 30 |
| Trailing edge angle A | degrees | 1 | 12 | 12 | 12 | 12 | 1 | 12 | 12 |
| Leading edge curvature ratio (D1/D2) | — | 0.46 | 0.4 | 0.4 | 0.4 | 0.4 | 0.4 | 0.46 | 0.4 |
| Tail tension at Max thickness | — | 1 | 0.5 | 0.5 | 0.5 | 0.5 | 0.5 | 0.5 | 1 |
| Tail tension at Trailing edge | — | 1 | 1 | 1 | 1 | 1 | 1 | 1 | 1 |
| Performance | | | | | | | | | |
| Optimum TSR | | 2.76 | 2.7 | 2.76 | 2.7 | 2.7 | 2.6 | 2.7 | 2.7 |
| Efficiency | | 0.47 | 0.441 | 0.445 | 0.445 | 0.441 | 0.443 | 0.441 | 0.440 |
| Performance Delta to NACA 0018 baseline | | | | | | | | | |
| Optimum TSR (DELTA) | | 2.2% | | 2.2% | 0.0% | 0.0% | -3.7% | 0.0% | 0.0% |
| Efficiency (DELTA) | | 5.5% | | 1.1% | 1.0% | 0.0% | 0.5% | 0.1% | -0.2% |

Each of Tables 9-11 presents the value of each design parameter of the optimal XWA-003 rotor, and the same value for the corresponding prior art rotor. To better illustrate the invention, a series of CFD analyses were undertaken, in each of which one respective parameter of the prior art rotor was changed to be the same as the corresponding parameter of the XWA-003 rotor, and the results of these analyses are presented in each table as EVO 1 . . . EVO 6.

FIGS. 32-34 present the calculated effect on Cp for each of these CFD cases relative to the efficiency of the respective unmodified prior art rotor (the values presented as "Efficiency (DELTA)" in Tables 9-11) in graphic form for ease of comparison.

The Cp v. TSR efficiency curves for each CFD case in tables 9-11 are presented in FIGS. 35-37, wherein it will be understood that the optimal Cp and TSR values of each curve are presented in the corresponding table as "Efficiency" and "Optimum TSR".

It can be seen that the effect of varying each of the parameters differs markedly from one prior art rotor to another. Thus, for example, the variation of EVO 1 (changing the angle of attack AA to 3.5° positive) improves the efficiency of the NACA 0015 and NACA 0018 rotors but reduces that of the S 824 rotor. Taking another example, the position of the centre point P4 (at 30% of the chord length C from the leading edge 13) in the XWA-003 rotor is the same as that of the baseline (i.e. unmodified) NACA 0015 and NACA 0018 rotors, yet changing this value in the S 824 rotor to be the same as that of the XWA-003 rotor (EVO 3) markedly reduces its efficiency.

Moreover, the VAWT rotor design problem is found to define a highly non-linear design space, wherein the sum of individual parameter modifications does not equate to the overall efficiency improvement. In developing the novel aerofoil profile it was found that the interdependence of the respective design parameters was such that changes tending to establish trends towards improved efficiency in fact led away from the optimal combination of values disclosed herein.

The data presented in the variant parameter analysis (Tables 9-11 and FIGS. 32-37) also help to illustrate the options open to the designer of a wind turbine installation in accordance with the invention. It is noted that the value of the angle of attack AA (EVO 1) tends to affect efficiency particularly at a higher TSR, whereas the values of the trailing edge angle A (EVO 4) and to a lesser degree the leading edge curvature ratio (EVO 5) tend to affect efficiency particularly at a lower TSR. The skilled person may selectively vary these parameters within the defined range in accordance with the invention to design a rotor which diverges from the optimal XWA-003 embodiment but with a performance curve which maximises output in a particular range of conditions. For example, if it is desired to maximise output during periods of very high windspeed, when the maximum rotational speed of the rotor (dictated by structural or other equipment limitations) may be below the optimum TSR, then the trailing edge angle A and leading edge curvature ratio may be varied relative to the other parameters to shift the Cp v. TSR curve so that the rotor operates more efficiently at the lower end of the TSR range for the optimal XWA-003 embodiment. If it is desired to ensure continuous output during periods of low windspeed, when the minimum rotational speed of the rotor may be above the optimum TSR, then the angle of attack A may be varied relative to the other parameters to shift the Cp v. TSR curve accordingly.

In summary, a preferred vertical axis wind turbine comprises a symmetric aerofoil having a concavely curved tail portion defining a trailing edge angle of between 0° and 5° on either side of the chord, a maximum thickness centre point between 26% and 34% of the length of the chord from the leading edge, a leading edge curvature ratio (D1/D2) from 0.42 to 0.50, and a ratio of maximum thickness to chord length T/C from 0.12 to 0.19, preferably 0.16. Advantageously, the rotor may have helical blades defining a cylindrical swept envelope with a positive angle of attack and a solidity ratio NC/D from 0.125 to 0.270, and is governed at a tip speed ratio from 2.25 to 4.00.

In alternative embodiments, the rotor (or any given portion of the rotor defined by a plane normal to the rotation axis) may have three blades (N=3), less preferably more than three blades (N>3), or only one blade (N=1) which may extend, preferably helically, for most of a full rotation, preferably 360° or a multiple of 360°, around the axis of rotation.

Preferably each blade extends along the whole axial length of the rotor. Alternatively, if preferred for modularity, ease of assembly, or other reasons, then a compound rotor may comprise more than one rotor portion arranged in stacked relation along the rotation axis, in which case at least one and preferably each of those rotor portions is configured as defined herein to have a solidity ratio NC/D wherein the number of blades N is defined by the number of blade sections in a respective plane 10 passing through that respective rotor portion.

Preferably the novel profile extends for at least most, more preferably substantially all of the length of the blade, which is to say, most or all of the length of the blade has a profile according to the invention. Where the swept envelope is cylindrical, the profile is advantageously constant along the length of the blade, although if preferred (and particularly where the envelope is non-cylindrical, e.g. conforming to a troposkien) it is possible to provide most or all of the blade with a profile according to the invention, but to vary the profile (either in its global dimensions or in terms of the relative values of its geometric parameters) either continuously or step-wise along the length of the blade.

It will be appreciated that at any given point along the length of the blade of a VAWT rotor, insofar as the parameters of the rotor and aerofoil fall within the range of values set out above, and irrespective of the configuration of the blades, the novel aerofoil profile (defined in a plane normal to the axis of rotation) may be expected to deliver a correspondingly high efficiency (Cp). The design of the rotor will impact on some of these parameters, notably the relationship between the solidity ratio and the TSR which as mentioned above will vary along the length of the blade in a non-cylindrical rotor. Nevertheless, it will be appreciated that in alternative embodiments, the novel aerofoil may equally well be applied to a Darrieus (troposkien) or any other desired VAWT rotor configuration with either a cylindrical or a non-cylindrical swept envelope in order to achieve an efficiency improvement commensurate with the parameters of that particular rotor configuration.

The novel aerofoil is therefore suitable for use in the rotor of any VAWT, as distinct from that of a HAWT which has very different aerodynamics. However, although the VAWT is named after the vertical orientation of its axis, its defining characteristic is rather that the blades extend generally along the direction of the rotor axis, instead of radially outwardly from the axis as in a HAWT. The vertical orientation of the axis is important because it enables the VAWT to generate power irrespective of the direction of the windstream, without requiring any yawing mechanism. However, for unusual applications, it is also conceivable to deploy a VAWT in a non-vertical orientation.

Many further adaptations will be evident to those skilled in the art within the scope of the claims.

The invention claimed is:

1. A wind turbine rotor having a blade or blades configured to rotate about an axis of rotation, wherein when considered in a plane normal to the axis of rotation and passing through the blade or each of the blades, the blade or each blade has a respective section bounded by a profile defining an airfoil, the blade or blades consisting of a number N of blades wherein N≥1;

the profile being symmetrical about a chord being a first straight line of length C between first and second points defining respectively a leading edge and a trailing edge of the profile;

the respective section having a maximum thickness T transverse to the chord between opposite maximum thickness points P3 on the profile, wherein a second straight line of length T between the opposite maximum thickness points P3 is normal to the chord and intersects the chord at a center point P4;

the rotor having a radius of length R in the plane of the profile between the axis of rotation and the center point P4, and a diameter D wherein D=2R;

the profile having an angle of attack defined as an angle between the chord and a third straight line normal to the radius and passing through the center point P4 in the plane of the profile;

and wherein a fourth straight line normal to the chord and passing through the leading edge intersects a fifth straight line parallel with the chord and passing through a respective one of the maximum thickness points P3 at a first intersection point P5;

a sixth straight line between the center point P4 and the first intersection point P5 intersects the profile at a second intersection point P6;

and a seventh straight line between the leading edge and the respective one of the maximum thickness points P3 intersects the sixth straight line at a third intersection point P7;

the profile having, between the leading edge and each maximum thickness point P3, a smooth curvature defined by a leading edge curvature ratio D1/D2, wherein D1 is a distance along the sixth straight line between the third intersection point P7 and the second intersection point P6, and D2 is a distance along the sixth straight line between the third intersection point P7 and the first intersection point P5;

wherein the section defines on each side of the chord a concavity between the respective maximum thickness point P3 and the trailing edge, and respective concavely curved portions of the profile defining each concavity converge towards respective rearward extremities of the concavely curved portions proximate the trailing edge;

the profile has a trailing edge angle A of between 0° and 5° between the chord and a tangent of a respective one of the concavely curved portions of the profile at its rearward extremity;

the center point P4 is positioned between 26% and 34% of the length C of the chord from the leading edge;

the leading edge curvature ratio D1/D2 is from 0.42 to 0.50;

and the profile has a ratio of maximum thickness to chord length T/C=0.16 plus or minus an optional thickness deviation, wherein the thickness deviation is from −0.04 to +0.03.

2. A wind turbine rotor according to claim 1, wherein the blade or each blade has a length, and the radius is substantially constant along at least most of the length of the or each blade, so that the blade or blades describe a generally cylindrical swept envelope about the axis of rotation.

3. A wind turbine rotor according to claim 2, wherein the rotor has a solidity ratio NC/D from 0.125 to 0.270.

4. A wind turbine rotor according to claim 2, wherein the rotor has a solidity ratio NC/D from 0.145 to 0.235.

5. A wind turbine rotor according to claim 2, wherein the blade or each blade is curved along its length around the axis of rotation, so that when considered in a static position of the rotor, the blade extends or the blades together extend through at least most of a full revolution around the axis of rotation.

6. A wind turbine rotor according to claim 5, wherein N=2.

7. A wind turbine rotor according to claim 1, wherein the thickness deviation is from −0.025 to +0.01.

8. A wind turbine rotor according to claim 1, wherein the profile has a zero or positive angle of attack, and the zero angle of attack is defined by collinearity of the chord with the third straight line, and the positive angle of attack is defined by divergence of the chord progressively outwardly from the third straight line with respect to the axis of rotation from the center point P4 to the leading edge, and wherein the positive angle of attack is not more than 4°.

9. A wind turbine rotor according to claim 1, wherein the trailing edge angle A is between 0° and 2.5°; the center point P4 is positioned between 28% and 32% of the length C of the chord from the leading edge;

and the leading edge curvature ratio D1/D2 is from 0.44 to 0.48.

10. A wind turbine comprising a wind turbine rotor having a blade or blades configured to rotate about an axis of rotation, wherein when considered in a plane normal to the axis of rotation and passing through the blade or each of the blades, the blade or each blade has a respective section bounded by a profile defining an airfoil, the blade or blades consisting of a number N of blades wherein N≥1;

the profile being symmetrical about a chord being a first straight line of length C between first and second points defining respectively a leading edge and a trailing edge of the profile;

the respective section having a maximum thickness T transverse to the chord between opposite maximum thickness points P3 on the profile, wherein a second straight line of length T between the opposite maximum thickness points P3 is normal to the chord and intersects the chord at a center point P4;

the rotor having a radius of length R in the plane of the profile between the axis of rotation and the center point P4, and a diameter D wherein D=2R;

the profile having an angle of attack defined as an angle between the chord and a third straight line normal to the radius and passing through the center point P4 in the plane of the profile;

and wherein a fourth straight line normal to the chord and passing through the leading edge intersects a fifth straight line parallel with the chord and passing through a respective one of the maximum thickness points P3 at a first intersection point P5;

a sixth straight line between the center point P4 and the first intersection point P5 intersects the profile at a second intersection point P6;

and a seventh straight line between the leading edge and the respective one of the maximum thickness points P3 intersects the sixth straight line at a third intersection point P7;

the profile having, between the leading edge and each maximum thickness point P3, a smooth curvature defined by a leading edge curvature ratio D1/D2, wherein D1 is a distance along the sixth straight line between the third intersection point P7 and the second intersection point P6, and D2 is a distance along the sixth straight line between the third intersection point P7 and the first intersection point P5;

wherein the section defines on each side of the chord a concavity between the respective maximum thickness point P3 and the trailing edge, and respective concavely curved portions of the profile defining each concavity converge towards respective rearward extremities of the concavely curved portions proximate the trailing edge;

the profile has a trailing edge angle A of between 0° and 5° between the chord and a tangent of a respective one of the concavely curved portions of the profile at its rearward extremity;

the center point P4 is positioned between 26% and 34% of the length C of the chord from the leading edge;

the leading edge curvature ratio D1/D2 is from 0.42 to 0.50;

and the profile has a ratio of maximum thickness to chord length T/C=0.16 plus or minus an optional thickness deviation, wherein the thickness deviation is from −0.04 to +0.03, wherein the blade or each blade has a length, and the radius is substantially constant along at least most of the length of the or each blade, so that the blade or blades describe a generally cylindrical swept envelope about the axis of rotation and a controller, wherein the controller is arranged to govern the rotor at a tip speed ratio from 2.25 to 4.00.

11. A wind turbine according to claim 10, wherein the controller is arranged to govern the rotor at a tip speed ratio from 2.61 to 3.70.

12. A wind turbine according to claim 10, wherein the controller is arranged to govern the rotor at a tip speed ratio from 2.76 to 3.50.

13. A method of designing a wind turbine rotor having a blade or blades configured to rotate about an axis of rotation, wherein when considered in a plane normal to the axis of rotation and passing through the blade or each of the blades, the blade or each blade has a respective section bounded by a profile defining an airfoil, the blade or blades consisting of a number N of blades wherein N≥1;

the profile being symmetrical about a chord being a first straight line of length C between first and second points defining respectively a leading edge and a trailing edge of the profile;

the respective section having a maximum thickness T transverse to the chord between opposite maximum thickness points P3 on the profile, wherein a second straight line of length T between the opposite maximum thickness points P3 is normal to the chord and intersects the chord at a center point P4;

the rotor having a radius of length R in the plane of the profile between the axis of rotation and the center point P4, and a diameter D wherein D=2R;

the profile having an angle of attack defined as an angle between the chord and a third straight line normal to the radius and passing through the center point P4 in the plane of the profile;

and wherein a fourth straight line normal to the chord and passing through the leading edge intersects a fifth straight line parallel with the chord and passing through a respective one of the maximum thickness points P3 at a first intersection point P5;

a sixth straight line between the center point P4 and the first intersection point P5 intersects the profile at a second intersection point P6;

and a seventh straight line between the leading edge and the respective one of the maximum thickness points P3 intersects the sixth straight line at a third intersection point P7;

the profile having, between the leading edge and each maximum thickness point P3, a smooth curvature defined by a leading edge curvature ratio D1/D2, wherein D1 is a distance along the sixth straight line between the third intersection point P7 and the second intersection point P6, and D2 is a distance along the sixth straight line between the third intersection point P7 and the first intersection point P5;

wherein the method includes:

defining on each side of the chord a concavity between the respective maximum thickness point P3 and the trailing edge, wherein respective concavely curved portions of the profile defining each concavity converge towards respective rearward extremities of the concavely curved portions proximate the trailing edge;

selecting a trailing edge angle A of between 0° and 5° between the chord and a tangent of a respective one of the concavely curved portions of the profile at its rearward extremity;

positioning the center point P4 between 26% and 34% of the length C of the chord from the leading edge;

selecting the leading edge curvature ratio D1/D2 from 0.42 to 0.50;

and selecting a ratio of maximum thickness to chord length T/C=0.16 plus or minus an optional thickness deviation, wherein the thickness deviation is from −0.04 to +0.03.

14. The method according to claim 13 further comprising truncating the profile at a truncation point not more than 0.1C from the trailing edge.

15. The method according to claim 14 further comprising directionally scaling the truncated profile along the chord.

* * * * *